(12) United States Patent
Manouchehri et al.

(10) Patent No.: US 12,014,640 B1
(45) Date of Patent: Jun. 18, 2024

(54) DRONE TO DRONE COMMUNICATION AND TASK ASSIGNMENT

(71) Applicant: MetroStar Systems LLC, Reston, VA (US)

(72) Inventors: Ali Reza Manouchehri, McLean, VA (US); Udaya Chundury, Aldie, VA (US); Vy Truong, Vienna, VA (US)

(73) Assignee: MetroStar Systems LLC, Reston, VA (US)

( * ) Notice: Subject to any disclaimer, the term of this patent is extended or adjusted under 35 U.S.C. 154(b) by 0 days.

(21) Appl. No.: 18/206,755

(22) Filed: Jun. 7, 2023

(51) Int. Cl.
*G08G 5/00* (2006.01)
*B64U 10/00* (2023.01)
*H04L 9/40* (2022.01)
*B64U 101/20* (2023.01)
*B64U 101/30* (2023.01)

(52) U.S. Cl.
CPC .......... *G08G 5/0043* (2013.01); *B64U 10/00* (2023.01); *G08G 5/0008* (2013.01); *G08G 5/003* (2013.01); *H04L 63/083* (2013.01); *H04L 63/105* (2013.01); *B64U 2101/20* (2023.01); *B64U 2101/30* (2023.01)

(58) Field of Classification Search
CPC .... G08G 5/0043; G08G 5/0008; G08G 5/003; B64U 10/00; B64U 2101/20; B64U 2101/30; H04L 63/083; H04L 63/105
See application file for complete search history.

(56) References Cited

U.S. PATENT DOCUMENTS

| | | | |
|---|---|---|---|
| 11,466,997 B1 | 10/2022 | Williams et al. | |
| 2011/0184604 A1 | 7/2011 | Franke | |
| 2014/0166816 A1 | 6/2014 | Levien et al. | |
| 2016/0225263 A1 | 8/2016 | Salentiny et al. | |
| 2017/0053169 A1 | 2/2017 | Cuban et al. | |
| 2017/0073085 A1* | 3/2017 | Tremblay | B64F 1/125 |
| 2017/0355457 A1* | 12/2017 | Terry | G05D 1/0094 |
| 2017/0358213 A1* | 12/2017 | Priest | G08G 5/0008 |
| 2018/0137454 A1* | 5/2018 | Kulkarni | B64C 39/024 |
| 2018/0279105 A1 | 9/2018 | Huber et al. | |
| 2018/0327091 A1* | 11/2018 | Burks | H04W 4/44 |
| 2019/0045348 A1 | 2/2019 | Li et al. | |
| 2019/0235489 A1* | 8/2019 | Cantrell | G08G 5/0069 |
| 2019/0278897 A1* | 9/2019 | Zhang | G06F 21/604 |
| 2020/0051439 A1* | 2/2020 | Priest | G08G 5/045 |
| 2020/0090527 A1* | 3/2020 | Priest | H04W 84/00 |
| 2020/0160730 A1* | 5/2020 | Priest | G08G 5/0069 |
| 2020/0286393 A1* | 9/2020 | Priest | G08G 5/0082 |
| 2020/0334448 A1 | 10/2020 | Ghazaryan et al. | |
| 2021/0092604 A1 | 3/2021 | Fox et al. | |

(Continued)

*Primary Examiner* — Mussa A Shaawat
(74) *Attorney, Agent, or Firm* — Leila A. Kanani

(57) ABSTRACT

One example method of operation may include receiving, at a first drone, one or more communications from a second drone, identifying, via the first drone, the one or more communications comprises at least one of an identifier of the second drone and a request for an identifier of the first drone, transmitting, via the first drone, an authentication request comprising the identifier of the second drone to a server, receiving, via the first drone, a confirmation from the server indicating the second drone is assigned a valid token and is authorized to participate in a current mission, and transmitting, via the first drone, an instruction associated with the current mission to the second drone.

17 Claims, 19 Drawing Sheets

(56) References Cited

U.S. PATENT DOCUMENTS

| | | | |
|---|---|---|---|
| 2021/0099870 A1* | 4/2021 | Moon | H04W 12/06 |
| 2021/0349458 A1* | 11/2021 | Pu | H04W 4/40 |
| 2022/0297835 A1 | 9/2022 | Lim | |
| 2023/0019340 A1* | 1/2023 | Priest | G08G 5/0052 |
| 2023/0421243 A1 | 12/2023 | Tripathi | |

* cited by examiner

200

250

DRONE TO DRONE COMMUNICATION AND TASK ASSIGNMENT

TECHNICAL FIELD OF THE APPLICATION

This application relates to drone authorization and management, and more specifically to tracking and monitoring a plurality of drones.

BACKGROUND OF THE APPLICATION

Conventionally, drones are used to perform reconnaissance and other tracking procedures by flying over a particular area and capturing images, video and performing other sensory based operations, such as detecting events, dropping payloads in predefined locations, etc. The parties utilizing the drones may be using a single drone management process that includes initiating the drone for flight patterns and storing the content captured by the drones for a particular launch cycle. The number of drones being utilized at any particular time and their specific roles during operation remains a strategy that is employed on a case-by-case basis.

SUMMARY OF THE APPLICATION

Example embodiments of the present application provide at least a method that includes at least one of receiving, at a server, one or more communications from one or more drones, identifying, via the server, the one or more drones are active in a predefined geographical area, authorizing, via the server, the one or more drones to receive one or more assignments, and performing, via the server, the one or more assignments to the one or more drones to perform one or more operations, wherein the operations assigned to the one or more drones are based on one or more roles and permissions assigned to the one or more drones.

Another example embodiment includes an apparatus with a receiver configured to receive one or more communications from one or more drones, a processor configured to identify the one or more drones are active in a predefined geographical area, authorize the one or more drones to receive one or more assignments, and perform the one or more assignments to the one or more drones to perform one or more operations, wherein the operations assigned to the one or more drones are based on one or mare roles and permissions assigned to the one or more drones.

Another example embodiment includes a method that includes receiving, at a first drone, one or more communications from a second drone, identifying, via the first drone, the one or more communications comprises at least one of an identifier of the second drone and a request for an identifier of the first drone, transmitting, via the first drone, an authentication request comprising the identifier of the second drone to a server, receiving, via the first drone, a confirmation from the server indicating the second drone is assigned a valid token and is authorized to participate in a current mission, and transmitting, via the first drone, an instruction associated with the current mission to the second drone.

Another example embodiment includes an apparatus that includes a receiver configured to receive, at a first drone, one or more communications from a second drone, a processor configured to identify, via the first drone, the one or more communications comprises at least one of an identifier of the second drone and a request for an identifier of the first drone, a transmitter configured to transmit, via the first drone, an authentication request comprising the identifier of the second drone to a server, and wherein the receiver is also configured to receive a confirmation from the server indicating the second drone is assigned a valid token and is authorized to participate in a current mission, and wherein the transmitter is configured to transmit an instruction associated with the current mission to the second drone.

Another example embodiment includes a non-transitory computer readable storage medium configured to store instructions that when executed cause a processor to perform receiving, at a first drone, one or more communications from a second drone, identifying, via the first drone, the one or more communications comprises at least one of an identifier of the second drone and a request for an identifier of the first drone, transmitting, via the first drone, an authentication request comprising the identifier of the second drone to a server, receiving, via the first drone, a confirmation from the server indicating the second drone is assigned a valid token and is authorized to participate in a current mission, and transmitting, via the first drone, an instruction associated with the current mission to the second drone.

Another example embodiment includes a method that includes receiving, from a drone, one or more communications indicating a distress event experienced by the drone based on one or more indicators, transmitting a mitigation instruction message to the drone to initiate a mitigation operation, receiving from the drone, one or more communications comprising content stored on the drone, and transmitting a data purge instruction to the drone to purge data stored on the drone.

Another example embodiment includes an apparatus that includes a receiver configured to receive, from a drone, one or more communications indicating a distress event experienced by the drone based on one or more indicators, a transmitter configured to transmit a mitigation instruction message to the drone to initiate a mitigation operation, wherein the receiver is further configured to receive from the drone, one or more communications comprising content stored on the drone, and wherein the transmitter is configured to transmit a data purge instruction to the drone to purge data stored on the drone.

Another example embodiment includes a non-transitory computer readable storage medium configured to store instructions that when executed cause a processor to perform receiving, from a drone, one or more communications indicating a distress event experienced by the drone based on one or more indicators, transmitting a mitigation instruction message to the drone to initiate a mitigation operation, receiving from the drone, one or more communications comprising content stored on the drone, and transmitting a data purge instruction to the drone to purge data stored on the drone.

Another example embodiment includes a method that includes identifying a likelihood of an object Presence at one or more locations within a predefined distance of locations explored by a drone during one or more monitoring actions performed by the drone during a mission comprising a plurality of mission requirements, selecting one or more new monitoring actions to Perform by the drone based on the likelihood of the object presence to satisfy the mission requirements, and performing the one or more new monitoring actions by the drone.

Another example embodiment includes an apparatus that includes a processor configured to identify a likelihood of an object presence at one or more locations within a predefined distance of locations explored by a drone during one or more monitoring actions performed by the drone during a mission comprising a plurality of mission requirements, select one or more new monitoring actions to perform by the drone based on the likelihood of the object presence to satisfy the mission requirements, and perform the one or more new monitoring actions by the drone.

Another example embodiment includes a non-transitory computer readable storage medium comprising instructions that when executed cause a processor to perform identifying a likelihood of an object presence at one or more locations within a predefined distance of locations explored by a drone during one or more monitoring actions performed by the drone during a mission comprising a plurality of mission requirements, selecting one or more new monitoring actions to perform by the drone based on the likelihood of the object presence to satisfy the mission requirements, and performing the one or more new monitoring actions by the drone.

DETAILED DESCRIPTION OF THE APPLICATION

Figure 1A:
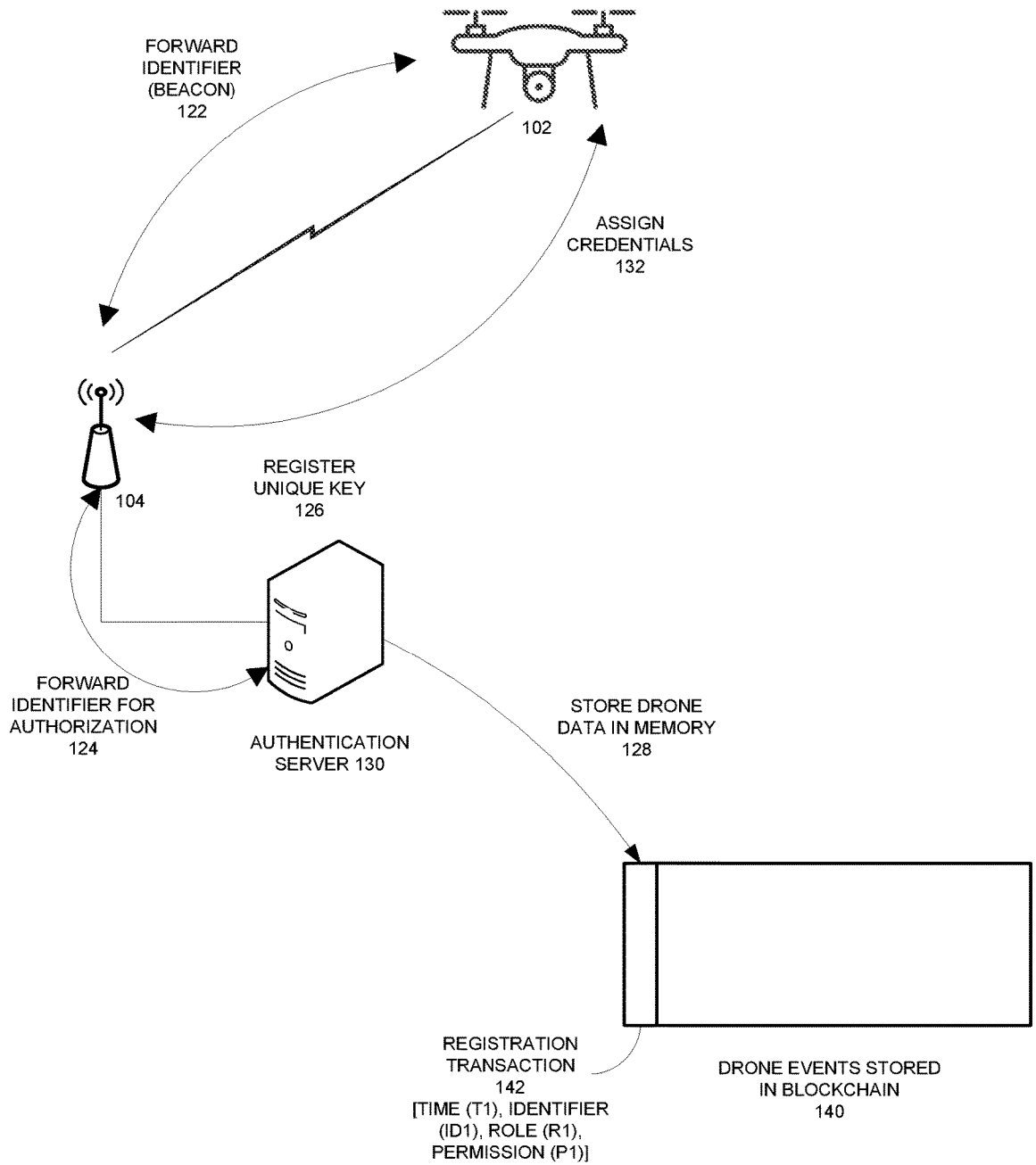
FIG. 1A illustrates a drone registration and authentication process according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes Packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide a system, server, computer device, etc., and one or more procedures and/or processes for identifying and managing one or more drones. In general, a drone fleet may include two or more drones, however, consideration must be made for a scenario where only one drone is active at a particular time. A drone may be mobile device that is capable of flying above the ground and which has various hardware components used to control the drone operation. In general, a drone has one or more propellers which are controlled by a motor that causes the drone to fly above the ground surface. Other examples may include drones which fly without propellers by using other propulsion techniques. Also, additional drones may be underwater, on the ground or may use jumping techniques to perform movements.

Additionally, the drone may have any number of cameras which are capable of capturing images and/or video content of an area above, even with or below the drone. The drone may also have sensors to detect sound, air disturbances, chemical presence, light, etc. The drone may also have the capability to collect a sample of material by a mechanical hand/claw and/or to drop an object it was previously carrying.

The internal components of a drone may include a computer or portions thereof, such as a memory, processor, storage, battery, software used to control the drone operation, a radio transceiver for transmitting/receiving a radio communication signal, etc. The drone may have a structure that protects its components and provides an aerodynamic body to provide a stable flight path during a flight operation. Any number of motors on the drone can be used to control the propeller(s), moving parts, etc.

Drones are increasingly used in various industries. The drone may transmit data to a ground station, such as a computer server that is accessible by a radio access point. The drone can capture content and send it wirelessly to the ground server continuously or in certain intervals depending on the information sharing procedure employed by the drone.

FIG. 1A illustrates a drone communication and authentication establishment process according to example embodiments. Referring to FIG. 1A, in the configuration 100, when a first drone 102, or a first set of drones, initially powers-up, turns-on and/or attempts to communicate with a primary communication station (e.g., drone authentication server 130), the drone 102 may use its transmitter/receiver component to wirelessly communicate and share its identity with the management entity. The process may include an identifier being forwarded as a beacon signal 122 by the drone 102 to an access point 104, such as a field router, a base station, a wireless hub, etc. The access point 104 may use satellite, cellular, and/or other wireless communication systems, mediums and protocols, such as Wi-Fi protocols, including 802.11xx or comparable protocols and/or frequencies. The access point 104 may be in communication with one or more servers and/or databases configured to store secure data related to the drone 102.

In one example, the beacon signal 122 may include a name, identifier code, protocol information, secure token data, smart contract information assuming a blockchain configuration is being used and/or other profile information (e.g., hardware address, etc.). The blockchain may assert authority to operate and act as an orchestrator to control all actions of the drone. As a distributed entity, the blockchain permits secure coordination of drone operations by permissioned entities. Due to the inherent consensus algorithm, no one can unilaterally alter data, unlike traditional authentication and storage systems. The access point can facilitate information exchange between drones and a drone management server by sending and receiving information to the drone as it is operating. The drone identifier information received 124 may be stored in the authentication server 130 which is responsible for storing drone profile information and forwarding tokens and credential information to the blockchain which verifies the credentials prior to the drone being assigned a mission or task related instructions. The server may commit transactions for records 128 of tokens, encryption key data 126, blockchain transactions 142 in a blockchain structure 140, etc.

When identifying and confirming authentication with the drone(s) 102, secure communication and identity management is performed to avoid any unauthorized entities from interfering with the efforts of the drone management system. One approach to authentication is to use a public-key cryptography to authenticate each of the drones. This may include requiring a public key to encrypt data sent to and from the drones. The Public/private key Pair assigned to a specific drone may ensure encrypted communications. Each time a drone is accessed, a unique key may be assigned to the drone 102 to ensure an encrypted communication session between the drone and the server.

Other access control mechanisms may be used to authorize drones based on their roles and permissions. When a drone establishes its operation, the drone may be assigned a particular status such as 'active' or 'inactive' to indicate it is ready or not ready to perform a particular task, the drone may be assigned a role, such as 'leader' or 'follower' to indicate whether it will be sending commands to other drones and entities in the field or whether it will be receiving the commands and following the command orders. If a leader is experiencing a degradation in its activities during a mission or other coordinated task with other drones, logic and information stored in a smart contract may be invoked to redefine a role and a mission to redistribute tasks so new drones can be established as leaders and mission tasks may be conducted. In one example, if a fleet of three drones are needed to take images and video of a particular geographical area, in order to ensure the drones perform unique reconnaissance efforts and do not overlap and interfere with one another, one leader drone may be needed to assign a first area to a first follower drone and a second area to a second follower drone while the leader performs other tasks. The leader drone may communicate with a plurality of other drones directly via radio communication. Each transaction or drone event may be logged in a blockchain 140 to maintain a ledger of all events performed by the drone(s).

A private (e.g., permissioned) blockchain 140 may be used to record drone presence and to manage their identities, roles and permissions during a registration and authorization procedure. A fungible token, such as an Ethereum request for comment (ERC20) token may be used as a mechanism to identify trusted drones. The token may be assigned previously and may be required to be received and verified prior to permitting a drone to be listed as accessible and authorized for use.

During the initial authorization and registration phase of a drone's operation, the event may be logged in a blockchain transaction to include various parameters, such as a current time (T1), a drone identifier ((ID1)—name, model, etc.), an initial role ((R1)—leader, follower, etc.), and one or more permissions ((P1)—read, write, assign missions, perform actions, etc.). The registration and authorization transaction 142 may be a first transaction that is stored in the blockchain 140. A smart contract may be used to assign rules and other criteria to the drones which can be applied in the field during a mission, such as capturing images and content over a specific geographical area and for a period of time.

Figure 1B:
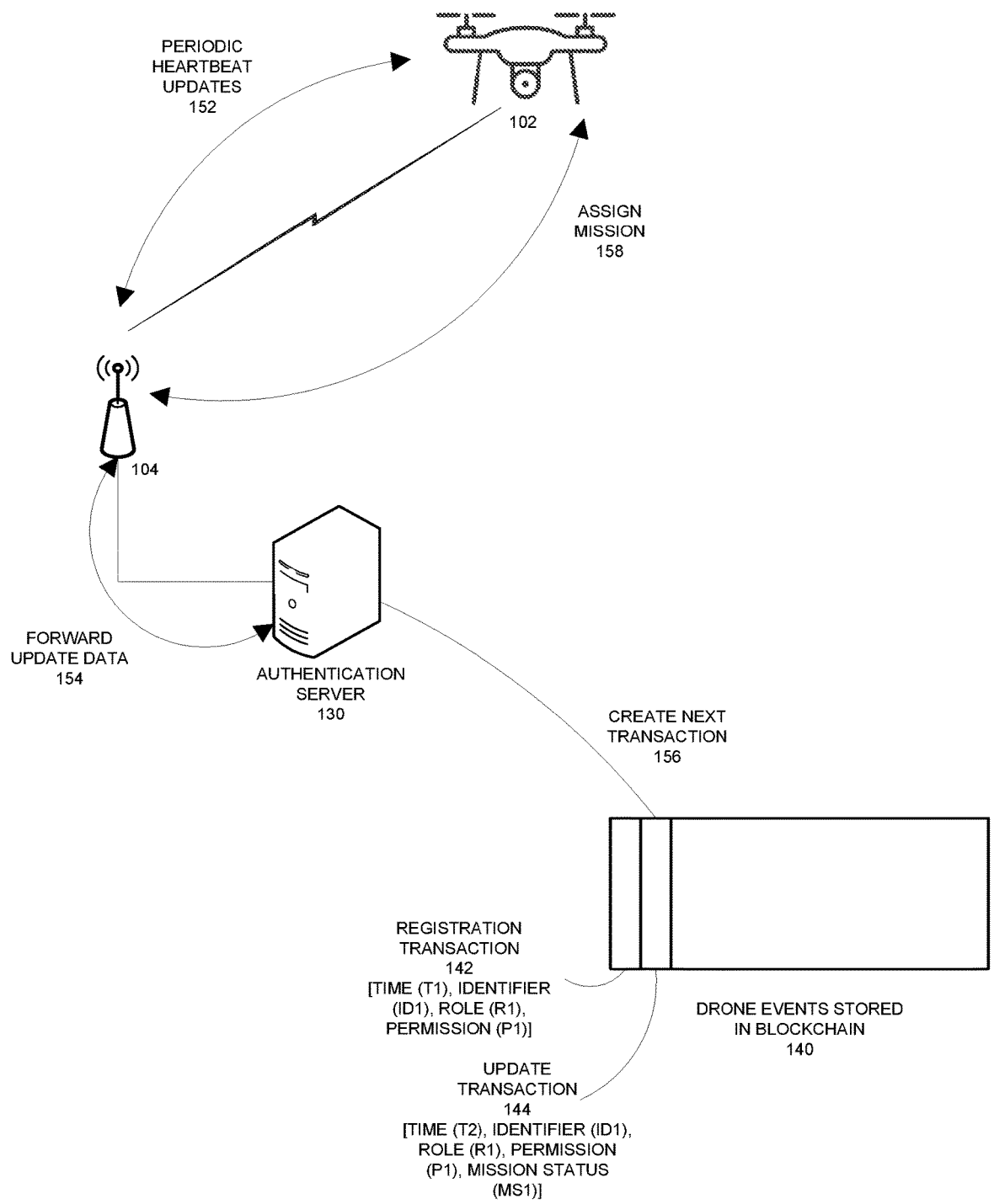
FIG. 1B illustrates a drone update and assignment process according to example embodiments.

FIG. 1B illustrates a drone update and assignment process according to example embodiments. Referring to FIG. 1B, the example configuration 150 may include the drone 102 transmitting periodic update signals (e.g., heartbeat signals) 152 to the server 130 which may require such signals be sent by all active drones every so often, such as before expiration of a 60 second time window. The time window may be reset each time a heartbeat communication is received and may be used to wait for another heartbeat communication to be received by the server 130. If the time window expires, the server 130 may update the ledger 140 and commit a new transaction that identifies the drone is offline.

A heartbeat communication mechanism may be used to track the online and offline status of drones. For example, when a drone 102 comes online and a power-up operation, a beacon signal may be sent to share its assigned identifier information with the authentication server 130. A monitoring configuration can assign tokens for newly identified drones and revoke tokens for offline drones which have not maintained a heartbeat signal communication at expected intervals for a Period of time. For example, a drone 102 that is actively communicating with the server may send a communication (heartbeat) signal every 30 seconds. When the server does not receive a heartbeat for 60 seconds, the drone 102 may be considered inactive and may have its token revoked for inactivity.

Each of the drones may be assigned a unique private key that is generated using a cryptographically secure random number generator and is used to identity verification credentials, token storage and transfer, and secure communication. To implement secure communications and identity management for the drones, hardware-based security features may be used with a blockchain to form a comprehensive security measure for drone-based applications.

In the example of FIG. 1B, the drone is forwarding periodic heartbeat communications 152 to the access point 104. When the communication is received, the authentication server 130 may create a transaction to log the updated status of the drone 102. For example, between every heartbeat signal a new set of content (images, video, etc.) may be identified by a communication sent by the drone 102. The storage server may update the ledger 140 to include a new transaction 144 to identify the current time (T2), the drone identifier (ID1), role (R1), permission (P1) and an updated mission status MS1, which in this example may indicate new content to store on the blockchain, such as media, images, video which need to be stored and catalogued for subsequent review. A next transaction creation operation 156 is performed to include in the ledger 140 with the updated information received. When a drone is reporting an update as in this example of FIG. 1B, the mission assignment may be changed and/or maintained and an updated mission message may be sent 158 including objectives, locations and other information necessary for the drone to perform the operations corresponding to the instructions received. For example, information which may be included in the mission assignment instructions 158 may include global positioning satellite (GPS) coordinates used to provide locations to capture content, battery life requirements, permissions needed to perform the drone actions, etc. The communication 158 may modify a current drone status and mission and overwrite the previous instructions in light of the new mission data received at the drone 102.

Figure 1C:
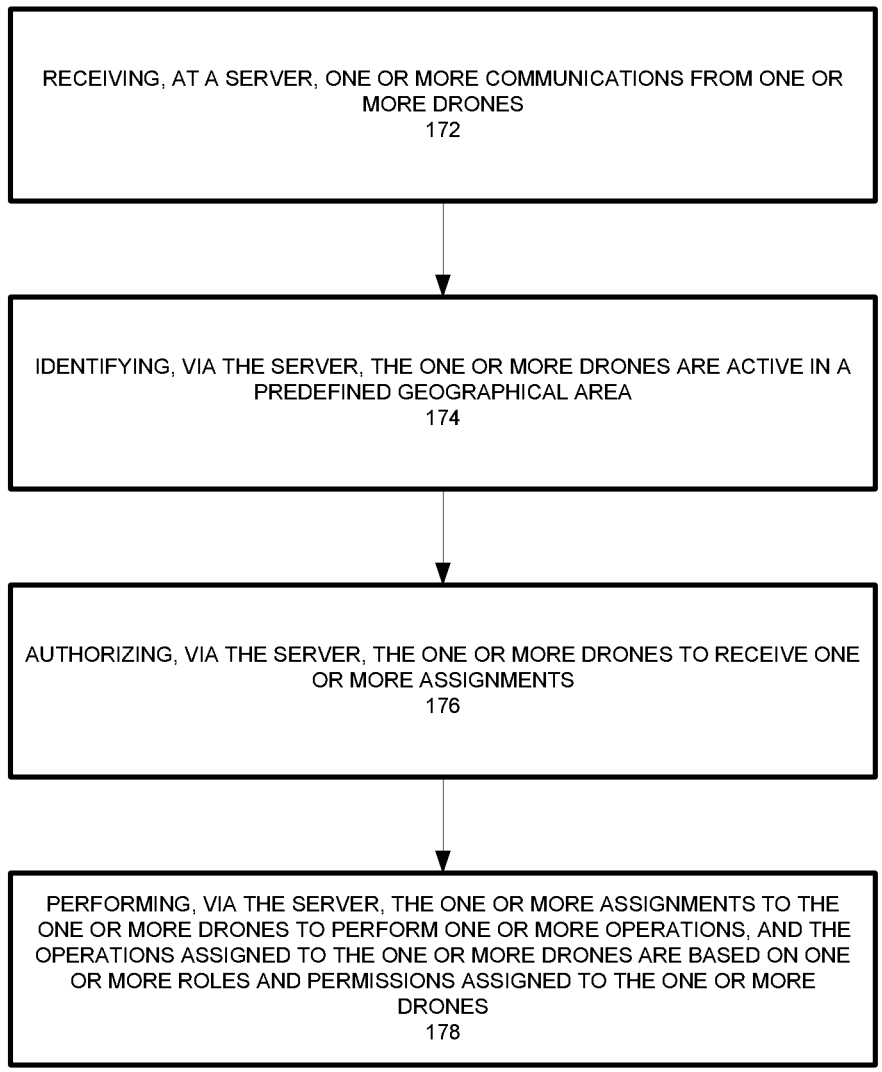
FIG. 1C illustrates an example flow diagram of an example drone registration and authentication process according to example embodiments.

FIG. 1C illustrates an example flow diagram of an example drone registration and authentication process according to example embodiments. Referring to FIG. 1C, a drone may be initialized during a power-up operation and may attempt to communicate with a device to register and receive credentialing. One example process may include receiving, at a server, one or more communications from one or more drones 172, the process may also include identifying, via the server, the one or more drones are active in a predefined geographical area 174, authorizing, via the server, the one or more drones to receive one or more assignments 176 and performing, via the server, the one or more assignments to the one or more drones to Perform one or more operations, and the operations assigned to the one or more drones are based on one or more roles and permissions assigned to the one or more drones. The drones with management or leader roles will receive leader oriented operations, such as to instruct other drones on how to complete a mission, what parts of a mission the leader drone will perform and what parts the other drones should perform. Examples may include shift work, such as monitoring an area for a period of time by one drone and then having another drone monitor the area for a second period of time while the first drone is charging or performing another operation.

Additional operations may include assigning a leader role and a leader permission to a first drone of the one or more drones, and the leader role permits the first drone to provide assignments to follower drones. Once the leader is established, the other drones may be identified as follower drones which are assigned tasks directly from the leader drone or via with the permission of a ground station device. The leader drone may ask the ground station permission to perform the assignment of a mission or tasks which make up a mission. All transactions may require token authorization and may be solidified by creating and storing a transaction in a blockchain. The process may also include assigning a follower role and a follower permission to a second drone of the one or more drones, and the follower role permits the second drone to receive an assignment from the first drone, and the follower permission requires the second drone to transmit one or more updates to the first drone to report updates on the assignment and a current status of the second drone. All drones must have a unique key registered in the blockchain and must have received a unique token. The specific role should be assigned as a leader or a follower. Each follower should know which leader could assign it tasks. Each assignment should be verified via a smart contract and each transaction should be posted in the blockchain by leader drones and follower drones. The roles and permissions and rules for accepting and denying assignments may be overridden by an authorized entity, such as an owner or entity that is controlling the one or more drones. The owner roles may be defined in the blockchain transactions and/or the smart contracts.

The one or more communications include 'heartbeat' signals periodically sent from each active drone, and the heartbeat signals include one or more of a drone identifier, a drone status, an assigned role and an assigned permission. The heartbeat signals may include a unique key assigned to each drone being sent to other drones and/or to ground station devices, such as a management server.

The process may also include creating a data entry in memory based on the unique key, storing the data entry in a blockchain transaction, and updating a smart contract to identify the leader role assignment and the follower role assignment, assigning a token to each of the one or more drones, and storing the one or more assigned tokens in the blockchain transaction. In one example, each of the communications is signed by the unique key associated with the drone that sent each of the communications, and the unique key may include a public key and private key pair.

Figure 2A:
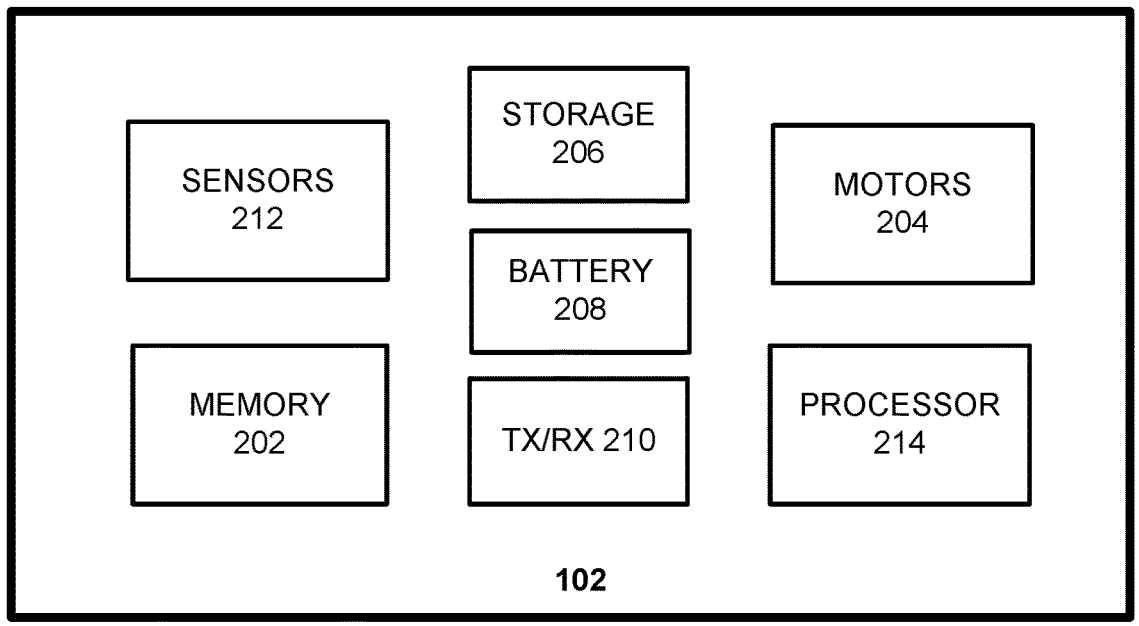
FIG. 2A illustrates an example drone configuration according to example embodiments.

FIG. 2A illustrates an example drone configuration according to example embodiments. Referring to FIG. 2A, the anatomy of the drones may include a system of components 200 which are needed to control and execute instructions associated with the drone's operation, Each drone may have a set of mechanical components (not shown), such as an aerodynamic body, propeller(s), landing structures, etc., and a set of internal components, such as one or more sensors 212 (e.g., light, sound, infrared, movement, heat sensors), a memory 212 to store digital information for drone operation, a permanent storage 206 for storing content that is captured, a battery for powering the digital components as well as the mechanical components, a transmitter/receiver pair 210 which may include one or more antennas and receivers for receiving and broadcasting wireless communication signals, one or more motors 204 and a processor 214 for computer based operations.

Figure 2B:
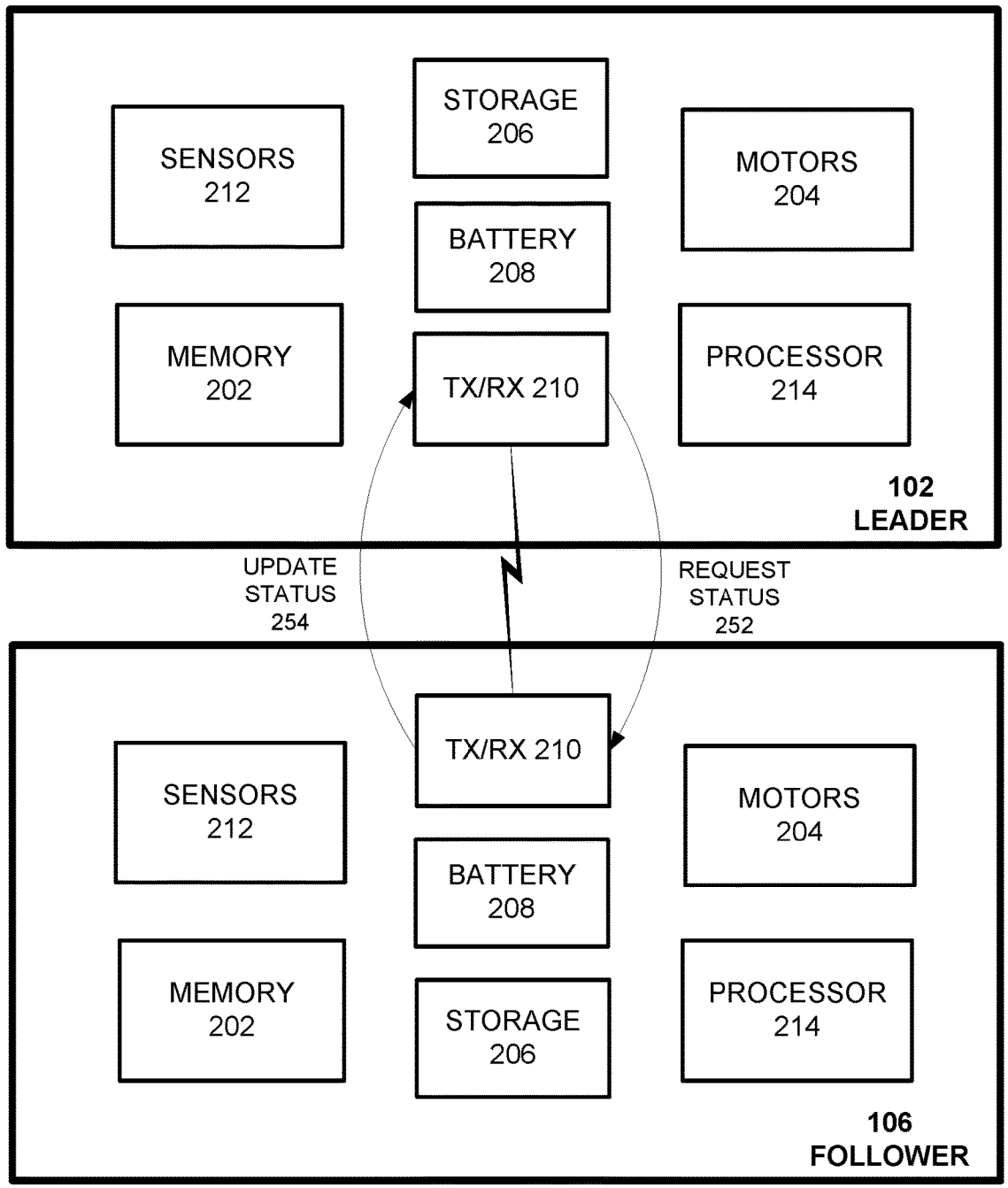
FIG. 2B illustrates another example drone configuration with multiple drones communicating according to example embodiments.

FIG. 2B illustrates another example drone configuration with multiple drones communicating according to example embodiments. Referring to FIG. 2B, each drone 102 and 106 and possibly other drones may be different from one another, some may have additional memory, batteries, motors, etc., that others do not have as part of their composition. Drones may communicate via their transmitter/receiver communication resources 210 to exchange roles, permissions, mission data, etc. A role may be a leader or follower and a leader may command a follower to perform tasks such as part of a mission the drone leader is attempting to have the follower drones perform. The permissions are the guiding factors which indicate what actions a drone can and cannot perform. For example, a leader drone can command a follower drone but not vice versa. The leader drone 102 may request a status 252 of another drone 106 which provides a status update 254. The drones can then share information once the drones have knowledge of one another and are authorized to communicate with one another.

Drones may be used to monitor areas of interest by capturing motion, noise, light detection via the one or more sensors included on the drone. Drones may also capture content and send the data received to another entity for recordation and/or action. In a military environment, a drone may be equipped with an ordnance or related weapon that can dispel a missile, chemical, or explosive. Certain actions detected by the drone may trigger actions, such as dispatch, messaging and other communication signals which enact a follow-up event to notify third parties and/or to enable the drone mission to be modified for additional screening operations. Additionally, drones may have robotized arms, legs and other mechanical components which can pickup and later drop packages and other objects at certain locations. Military drones play a vital role in modern warfare, providing situational awareness and intelligence to ground command. However, ensuring secure communication and managing drone identities becomes increasingly important as the drones become more autonomous and interconnected with the certain control systems.

A compromised (e.g., broken, inoperable, lost, etc.) drone can pose a significant risk to mission success and to the safety of personnel on the ground. Ideally, an authorized drone would share captured content, communications and other data with ground control systems or other drones on an ongoing basis to avoid information theft in the event that the drone was captured by an adverse party. Secure communication and drone identity management may be provided by using an immutable ledger, such as a blockchain. A blockchain is an immutable ledger that commits transactions which may include various information in a manner that ensures outside parties cannot access and/or destroy the information without the proper credentials.

A combination of secure communication protocols, authentication and authorization mechanisms may enable secure drone management operation. In one example, blockchain-based identity management, and using 'ERC20' tokens for trust verification may provide a secure way to authenticate and monitor drones. Also, using drone specific private keys for enhanced security and privacy may enable additional security measures.

A drone may use a secure communication protocol to communicate with a ground control station and/or other drones. The communication between drones can be secure by enabling transport layer security (TLS) or secure socket layer (SSL) protection to encrypt a particular communication channel. Additionally, authentication and authorization mechanisms can be used to ensure that only authorized drones can communicate with each other. Public-key cryptography may be used to authenticate drones. Each drone may have a unique private key that is used to sign messages, and a corresponding public key that is used to verify the signature. Other access control mechanisms may be used to authorize drones based on their roles and permissions.

In order to manage identities of drones, a blockchain-based approach may be used by creating a private (i.e., permissioned based) blockchain network that is accessible only to the assigned drones and which may be used to record and manage the drone identities. Each drone can have a unique identity that is recorded on the blockchain, along with its public key and other metadata. This process may ensure that each drone is identified and trusted within the network.

In order to ensure one drone can trust another drone, the 'ERC20' tokens can be used to establish a trust mechanism. For example, a token on the Ethereum blockchain can represent trust in a specific drone and can be assigned to other drones that have been verified and deemed trustworthy by an authorization procedure. Each drone can have a digital wallet as part of a drone profile which can store any respective tokens. When one drone needs to communicate with another drone, it can verify the trustworthiness of the other drone by checking its token balance to ensure it still has valid tokens. Token balance checking and other procedural operations may be used to track ERC20 token balances along with other token tracking operations.

To implement secure storage and retrieval of tokens, a decentralized storage solution, such as an interplanetary file system (IPFS) can be implemented. The IPFS can be used to store the token balances of each drone and ensure that they are securely retrieved when needed. To accommodate limited storage capacity and to avoid data tampering, a sub-block concept can be implemented where only the latest few sub-blocks are stored on the drone. The sub-block approach increases a speed of verification before blockchain transactions are posted by making it difficult to decipher information on captured drones. The full list of block IDs and link IDs would be missing from the captured drones even if the capturer successfully deciphers the information stored on a captured drone. The entirety of the data across all blocks would only be accessible on a controlled blockchain via ground station connectivity.

The drone private keys can be used for enhanced security and privacy by utilizing the drone private keys to authenticate drones, store and transfer tokens, and encrypt and decrypt messages transferred to and from the drones. Each drone's private key is generated using a cryptographically secure random number generator and stored securely within its hardware, such as a trusted platform module (TPM). This approach ensures that only authorized drones can participate in a common network and communication and transactions are authentic and confidential.

Drones may implement a heartbeat procedure that includes sending, receiving and/or monitoring for heartbeat style periodic communication sent and received by the drones and/or one or more ground systems that are in communication with the drones. In one example, the heartbeat mechanism includes drones periodically sending messages to indicate that they are online and operational to ground stations and/or other drones. The monitoring system tracks the heartbeat messages and maintains a record of which drones are online and which ones are offline and whether tokens are confirmed for those communications. If a drone is not identified by a heartbeat signal after a period of time (e.g., x minutes) and is deemed to have gone offline, its tokens can be revoked and re-allocated to other trusted drones, especially when the system is attempting to maintain a specific number of drones operating at all times.

To ensure secure communication with drone-to-drone or drone-to-ground control stations (e.g., computing devices), a unique serialized key can be added to each heartbeat communication along with communication protocols, such as micro aerial vehicle link (Mavlink) protocol. This approach uses a unique key that needs to be verified within a blockchain before transaction blocks can be added or accessed. For example, a genesis transaction or block and/or smart contract stored in the blockchain may store details of the unique key, a number of communications required, time intervals for when communications must be received, etc. The verification process can then reference the requirements when communications are received. This approach limits the ways that communication tampering can occur and reduces potential takeovers of drones by third parties.

Figure 3A:
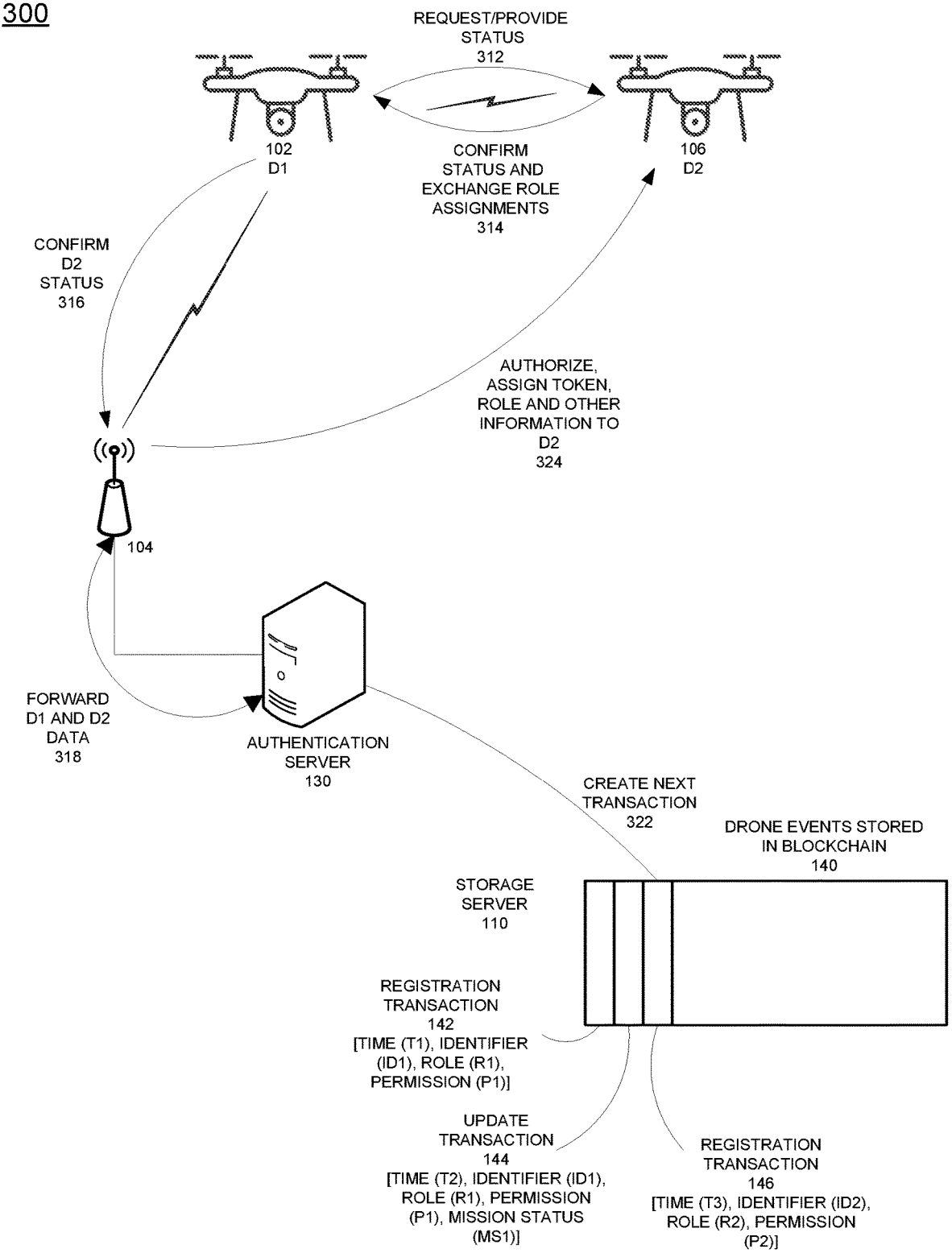
FIG. 3A illustrates multiple drones communicating with one another and registering with a drone management entity according to example embodiments.

FIG. 3A illustrates multiple drones communicating to one another and registering with a drone management entity according to example embodiments. Referring to FIG. 3A, the configuration 300 includes a plurality of drones 102 and 106. Additional drones may be included as well, however, in this example, there are two drones for simplicity. The drone D1 102 may initiate an information request message 312 to drone D2 106 to identify a current status, determine an identifier associated with drone D2 and/or to determine whether drone D2 is authorized to participate in a current mission. The drone D2 may confirm its status (i.e., active, inactive, authorized, etc.) in a response communication 314. The response may be sent directly to the first drone D1 or to the server 130. In this example, the first drone D1 may report 316 the status of itself and D2 since it is the leader drone. The access point 104 may forward the status information 318 to the server 130. The server 130 may authenticate drones D1 and D2, and create a new blockchain transaction 322 in the ledger indicating the registration transaction 146 for drone D2 106 to include a time, identifier for D2, a role (R2) for D2 and a Permission(s) (P2) for D2. The result may include sending an authorization message 324 to D2 directly including a newly assigned token and the other information pertaining to D2. The authorization may instead be sent to D1 which will store the information and notify D2 of the newly added transaction information.

Figure 3B:
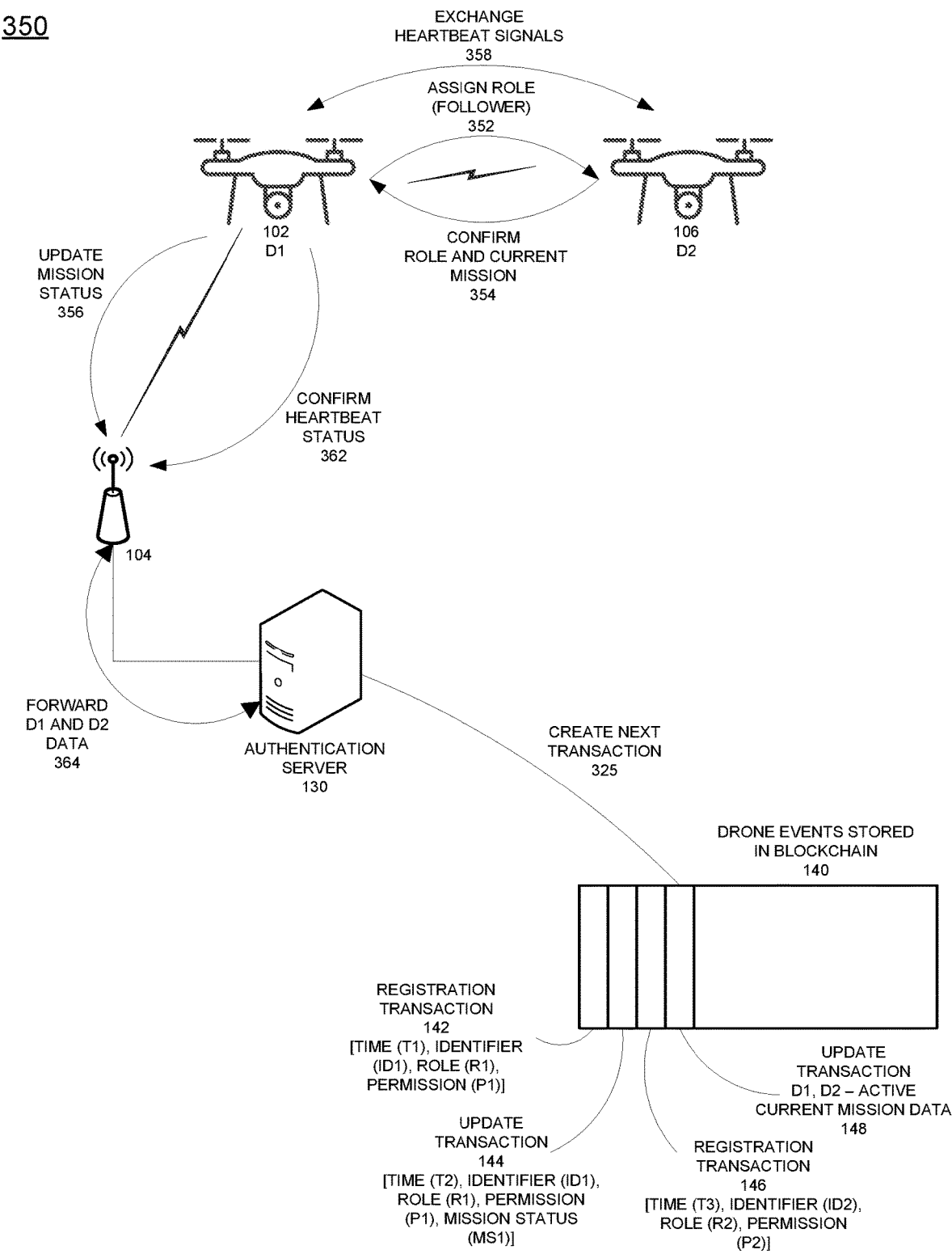
FIG. 3B illustrates multiple drones communicating to one another and exchanging mission objective information and according to example embodiments.

FIG. 3B illustrates multiple drones communicating to one another and exchanging mission objective information and according to example embodiments. Referring to FIG. 3B, the example configuration 350 may include the drone D1 102 attempting to assign 352 a role to D2 106, such as a follower role and information pertaining to a current mission 354, which may include areas to fly over and capture content. The mission status may be updated by a communication 356 sent from D1 to access point 104. The communication is forwarded 364 to the authentication server 130 so another transaction 325 may be committed 148 to the ledger 140. The transaction may include updated mission information such as, both drones are active and are assigned a current mission. Similar communications may be sent periodically confirming a heartbeat signal communication 358 shared between the drones D1 and D2. Heartbeat communications may also be sent 362 to the server 130 to confirm the drones are still active during a current mission or while awaiting a new mission. The heartbeat communications may include current status (e.g., mission status, battery level, locations traveled, content captured, etc.). Each heartbeat communication may also be committed to the ledger.

Figure 3C:
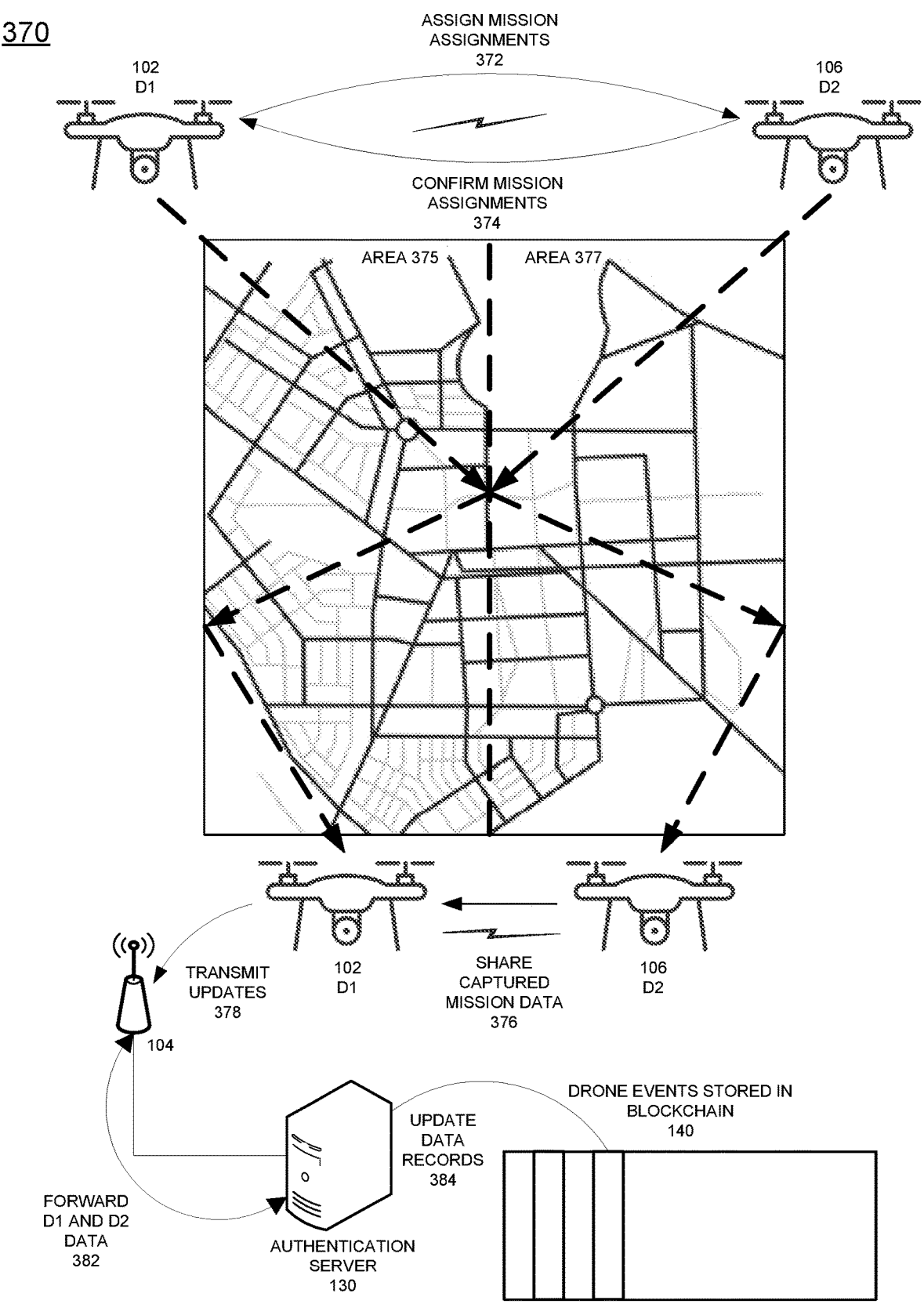
FIG. 3C illustrates multiple drones communicating to one another and performing mission tasks assigned to each specific drone according to example embodiments.

FIG. 3C illustrates multiple drones communicating to one another and performing mission tasks assigned to each specific drone according to example embodiments. Referring to FIG. 3C, the configuration 370 includes an example of two drones D1 and D2 sharing a current mission to perform data capturing of a particular area. Drone D1 may assign itself to capture images/video of area 375 and assign drone D2 to capture images/video of area 377 as part of a general area that needs to be flown over and studied by the drones as part of a current mission. The drones may fly in a particular pattern identified by the mission data to ensure the entire area is studied. The mission may be assigned 372 by a first drone D1 as a leader to a second drone D2 as a follower. The second drone D2 may confirm the mission assignment 374 and then the drones may begin actively performing the study of the area in a manner where they do not interfere with one another and share the responsibility of studying the entire area.

Once the area study is completed, the second drone D2 may submit its captured content to D1 and/or to the ground station server. If the first drone D1 receives the confirmation and/or the content 376 of D2 completing its study, then D1 can forward the mission data as an update 378 to the access point 104 which forwards the data 382 to the server 130, which updates the records of the mission 384 by sending the mission data to the ledger for storage.

Figure 3D:
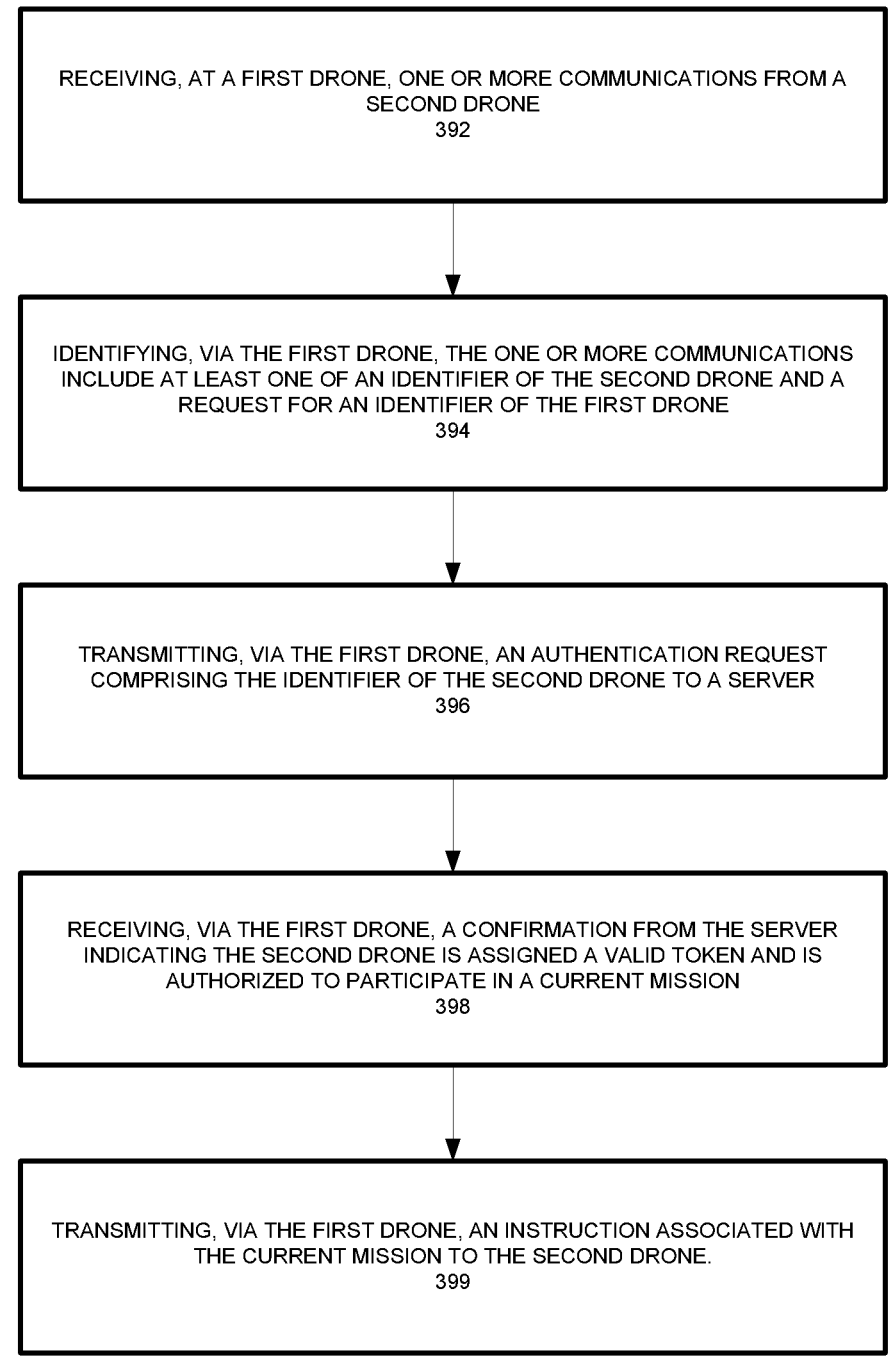
FIG. 3D illustrates an example flow diagram of an example drone to drone communication process according to example embodiments.

FIG. 3D illustrates an example flow diagram of an example drone to drone communication process according to example embodiments. Referring to FIG. 3D, the example process may include receiving, at a first drone, one or more communications from a second drone 392, identifying, via the first drone, the one or more communications includes at least one of an identifier of the second drone and a request for an identifier of the first drone 394, transmitting, via the first drone, an authentication request comprising the identifier of the second drone to a server 396, receiving, via the first drone, a confirmation from the server indicating the second drone is assigned a valid token and is authorized to participate in a current mission 398 and transmitting, via the first drone, an instruction associated with the current mission to the second drone 399.

The process may also include transmitting, via the first drone, a response communication to the second drone indicating a role assigned to the first drone and the current mission assigned to the first drone, and receiving, via the first drone, a confirmation from the second drone that the second drone is participating in the current mission with a different role than the role assigned to the first drone. The role may be a leader role and the response communication further a request to assign the second drone a follower role as the different role on the current mission. The process may also include transmitting an assignment communication, via the first drone to the second drone, comprising assignment instructions for the second drone to perform over a period of time as part of the current mission, and receiving a confirmation, via the first drone, that the second drone has accepted the assignment instructions. The process may also include receiving, via the first drone, one or more heartbeat communications from the second drone at predefined time intervals, and transmitting a confirmation, via the first drone, to one or more of the second drone and the server confirming the heartbeat communications were received. The process may further include receiving, via the first drone, one or more content communications from the second drone comprising content captured by the second drone as instructed by the current mission, and forwarding, via the first drone, a content removal communication instructing the second drone to remove the content captured. The process may also include moving the first drone over an area defined by the current mission and capturing content associated with the area, and receiving, via the first drone, a content confirmation communication by the second drone indicating the second drone has moved over a different area and captured content associated with the different area defined by the current mission.

To prevent data loss in case a drone is lost or stolen, the drone private keys can be backed-up and stored in a secure location. The backup and recovery process is designed to ensure that the private keys cannot be easily compromised by attackers. A secure communication protocol is used to encrypt the communications between the drones, while authentication and authorization mechanisms are applied to ensure that only authorized drones can communicate with each other. Blockchain-based identity management is used to manage the identities of the drones by committing and referencing blockchain transactions every time a drone registers with the system, and the ERC20 tokens are issued to the drones and used for trust verification during communication sessions.

A decentralized storage solution is used to securely store token balances and other data associated with the drones while they are being verified and are operational. Drones may be assigned private keys which are applied to enhance the security and privacy of the network, and the heartbeat mechanism and monitoring system ensures that the drones are operational and trusted within the network. Also, backup and recovery of private keys prevents data loss in case the drones are lost or stolen. Drones may forward information stored in their respective memories periodically so the information can be erased each time a communication is sent to other drones or a control station device. In a multi-domain environment, drones may need to communicate with each other across different networks, such as air, ground, or maritime networks.

In multi-domain environments, the addition of a multi-domain communication gateway may be necessary to act as a bridge between different communication networks and permit the drones to communicate with each other across different domains. The gateway would need to have its own security mechanisms to ensure that communication between different domains is secure and trusted. Additionally, domain-specific authentication and authorization mechanisms may provide cross-domain authorization and communications. Each domain may have its own set of rules and requirements for authenticating and authorizing drones that would need to be included in the architecture. For example, air-based drones may need to authenticate with an air control network, while ground-based drones may need to authenticate with the ground control network.

The modifications to the architecture for a multi-domain operational environment would depend on the specific requirements and challenges of the environment. However, the basic components of the architecture, such as secure communication, authentication and authorization, identity management, and trust verification, would still be applicable in a multi-domain environment.

In the event that a drone is compromised (e.g., lost, stolen, captured, etc.), and its machine learning models, artificial intelligence models and other data stored on the drone are at risk of access by adversaries, several approaches can be taken to secure the models using blockchain technology. One approach involves using a secure trusted execution environment to host the machine learning models. This would include isolating the models from the drone's main operating system and operating them in a secure environment that is protected by hardware-based security features. The secure enclave would be accessible only by authorized entities, and access to the enclave would be managed using blockchain-based authentication and authorization mechanisms.

Another option is to use a federated learning approach by which machine learning models are trained on multiple drones and updates are aggregated in a decentralized manner. This approach includes distributing the machine learning models across multiple drones and using a consensus mechanism, such as a blockchain consensus group of peers, to coordinate the updates. The models would be encrypted using a secure communication protocol and access is managed using blockchain-based authentication and authorization mechanisms.

Homomorphic encryption can be used to encrypt machine learning models and respective data inputs so they can be processed securely by a remote server without revealing the underlying data. This approach would include using a blockchain-based approach to manage the encryption keys and ensure that processing is done securely and reliably. The use of a blockchain can provide a secure and decentralized approach to managing machine learning models on drones. The specific approach taken would depend on the specific requirements and constraints of the drone network and would need to be carefully designed and implemented to ensure the security and privacy of the machine learning models and respective data.

Certain operations may involve multiple drones and ground entities (e.g., stationary devices, moving entities, vehicles, etc.) that are operating in different domains, such as air, ground, and/or sea. The drones and vehicles may be collecting data and information that needs to be shared with other drones and vehicles in real-time, while also ensuring that only authorized entities can access the data. Each drone and ground vehicle can have a unique identity that is recorded on the blockchain along with respective access control permissions. The data and information collected by each drone and vehicle can be stored on a decentralized storage solution, such as an interplanetary file system (IPPS), which is accessible only by the authorized entities. The access control permissions can be managed using a consensus mechanism, such as a blockchain, to ensure that only authorized entities can access the data.

One example includes using a trusted platform module (TPM) to isolate certain processing environments from a drone's main operating system and operate them in a secure environment. Another approach is to use secure enclaves or trusted execution environments, which can be hosted on hardware devices such as specialized chips or dedicated servers. For example, secure enclaves or trusted execution environments can be used to ensure that machine learning models are stored and processed in a secure environment, even if the drone is compromised. The environments are tamper-proof and can provide a secure location for storing encryption keys and other sensitive information, and can also limit unauthorized access to models by isolating them from the drone's main operating system and other applications.

When using homomorphic encryption to encrypt machine learning models and their inputs, specialized hardware devices such as application-specific integrated circuits (ASICs) can be used to accelerate the encryption and decryption processes. These devices are optimized for specific computations and can provide improved performance and efficiency over general-purpose computing hardware.

Another example embodiment may include using multi-domain machine learning, such as in a command, control, communication, computers, cyber, intelligence and surveillance (C5ISR) environment and in a multi-domain operational environment, machine learning algorithms can be used to process and analyze large amounts of data in real-time to provide insights and intelligence for decision-making. However, machine learning models may be at risk of being compromised or stolen by adversaries, especially in dynamic and adversarial environments. Using blockchain technology to store data and recall operatives and mission data, the machine learning models can be distributed across multiple drones and other field entities, such as ground vehicles in a decentralized manner, and the updates can be aggregated using a consensus mechanism, such as a blockchain. Data models can be encrypted using a secure communication protocol, and access to the data models can be managed using blockchain-based authentication and authorization mechanisms.

In one example, multiple drones and ground vehicles may be collecting data and sending the data to a machine learning algorithm that is processing the data in real-time. The machine learning algorithm may be analyzing data to provide intelligence on enemy movements, weather patterns, and other factors that may impact the mission. The learning algorithms may offer insight on how to conduct the mission more efficiently and to ensure additional measures are taken based on previously performed measures and recent discoveries. The updates to the machine learning model can be sent securely to a blockchain, where they are verified and recorded, and the updated models can be distributed to the drones and ground vehicles in a decentralized manner. For example, a smart contract may be updated to include additional mission information based on a comparison and threshold based decision procedure.

In one example, a drone may discover two ground vehicles which appear to be military types of vehicles. This may cause an association by the machine learning algorithm to determine that a radio communications control center or ground base has been setup nearby since most vehicles communicate to a radio base communication entity to update mission data and to receive and forward tactical operatives. The artificial intelligence may then determine an estimated location of the radio station based on the movement and/or positions of the vehicles, which, in turn, causes an update to the smart contract to include a new location and new object identification procedure which was not previously part of the mission data. The examples demonstrate how blockchain technology can be used to provide secure and decentralized approaches to managing data sharing, access control, and machine learning in a C5ISR and multi-domain operational environment. By leveraging the security and reliability of blockchain technology, military operations can improve their situational awareness and decision-making capabilities, while also ensuring the privacy and security of their data and machine learning models.

In another example, a mission may dictate that a group of drones be deployed to conduct image and/or radio reconnaissance and gather intelligence on identified object movements. The drones may be equipped with high-resolution cameras and sensors to detect activity, and may communicate with each other to share information and coordinate movements. As the drones fly over a certain territory, they may encounter various obstacles, such as electronic jamming signals being present and even hostile firepower. However, the drones are able to use their communication and identity management architecture to navigate through these obstacles and continue the mission. If the obstacle or distress event is detected prior to the drone losing control, the information stored on the drone may be sent to another drone and/or to a ground station for secure storage. Also, the drone may enter a distress operative where it attempts to purge its stored data.

In another example, after a successful reconnaissance mission, one of the drones may be captured, and the adversaries may attempts to access the drone's data and communication channels, however, the architecture's use of secure communication protocols and private keys prevents access by opposing parties. The captured drone's private key may be stored securely within the drone's hardware and may not be accessible to anyone except the drone itself, or the private key may already be transmitted and stored in the blockchain. This prevents a captured drone from providing access to the rest of the network by an opposing party.

The opposing parties may attempt to use the captured drone by creating a fake identity, however the use of blockchain-based identity management, secured by a smart contract prevents access attempts by third parties. Each drone's unique identity is recorded on the blockchain, along with its public key and other metadata, making it impossible to create a fake identity without being detected by the control center. Additionally, the use of ERC20 tokens as a trust mechanism ensures that only trusted drones are given access to the network. Also, the online and offline status of drones can be detected by heartbeat signals. If a drone goes offline or is captured, the monitoring system can revoke its tokens and re-allocate them to other trusted drones, ensuring that the captured drone's tokens will not be used to gain access to the network.

In another example, the drones may encounter increasingly sophisticated electronic jamming and signal interference from third parties. A machine learning algorithm can be used to adapt to changing signal environments and dynamically adjust communication parameters such as frequency and power to maintain secure communication. The drones may modify their flight paths to avoid likely areas of signal jamming, change an operating frequency used by the drone and seek additional modifications to a recurring mission to ensure the threats are reduced. A drone may also attempt to assign another drone as a decoy such that one drone is providing information capturing and the other drone is assigned to fly around an area and do nothing and collect no data so that drone will not pose a threat if captured since it has no data sharing or storing capabilities. Another example may include a multi-domain operational environment in which the drones need to communicate and share information with other entities and assets, such as ground personnel communication devices, naval vessels, other aircraft, etc. The security architecture can be extended to include secure communication and identity management across multiple domains, using common standards and protocols to ensure interoperability.

Figure 4A:
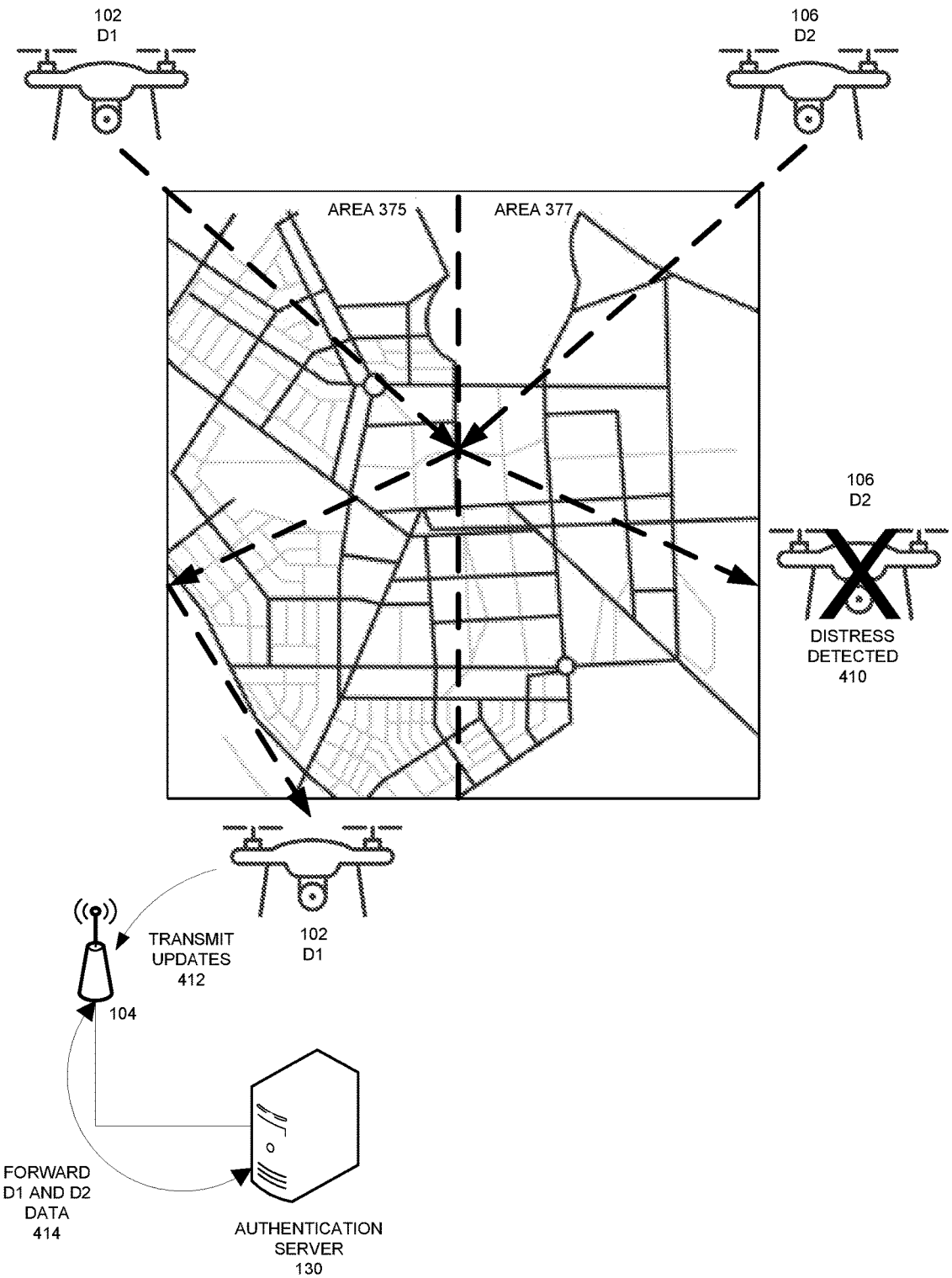
FIG. 4A illustrates multiple drones performing mission tasks assigned to each specific drone and one drone is experiencing distress according to example embodiments.

FIG. 4A illustrates multiple drones performing mission tasks assigned to each specific drone and one drone is experiencing distress according to example embodiments. Referring to FIG. 4A, the example configuration 400 includes two drones 102 and 106 performing a mission task(s) of flying over a particular area assigned to each drone respectively. The second drone D2 106 may have experienced a distress event 410 by a sensor condition, such as a temperature sensor, a vibration sensor, accelerometer, gyroscope, radio signal interference, etc. An adversary may have fired a missile at the drone, transmitted a jamming signal, etc., and the drone may determine that it may not be able to continue flying and may have fallen to the ground. Also, the drone may decide to escape the area by rapidly moving away and abandoning its current mission if it is still operable. Such a distress event may invoke distress event instructions which may cause the ERC tokens to be invalidated and an event update may be sent to another drone, such as D1. The drone D1 102 may still be conducting its mission and transmitting updates 412 to the access point 104 which forwards the data 414 for any drones which are reporting information to the authentication server 130 or any other device responsible for logging information in the blockchain or another data storage entity.

Figure 4B:
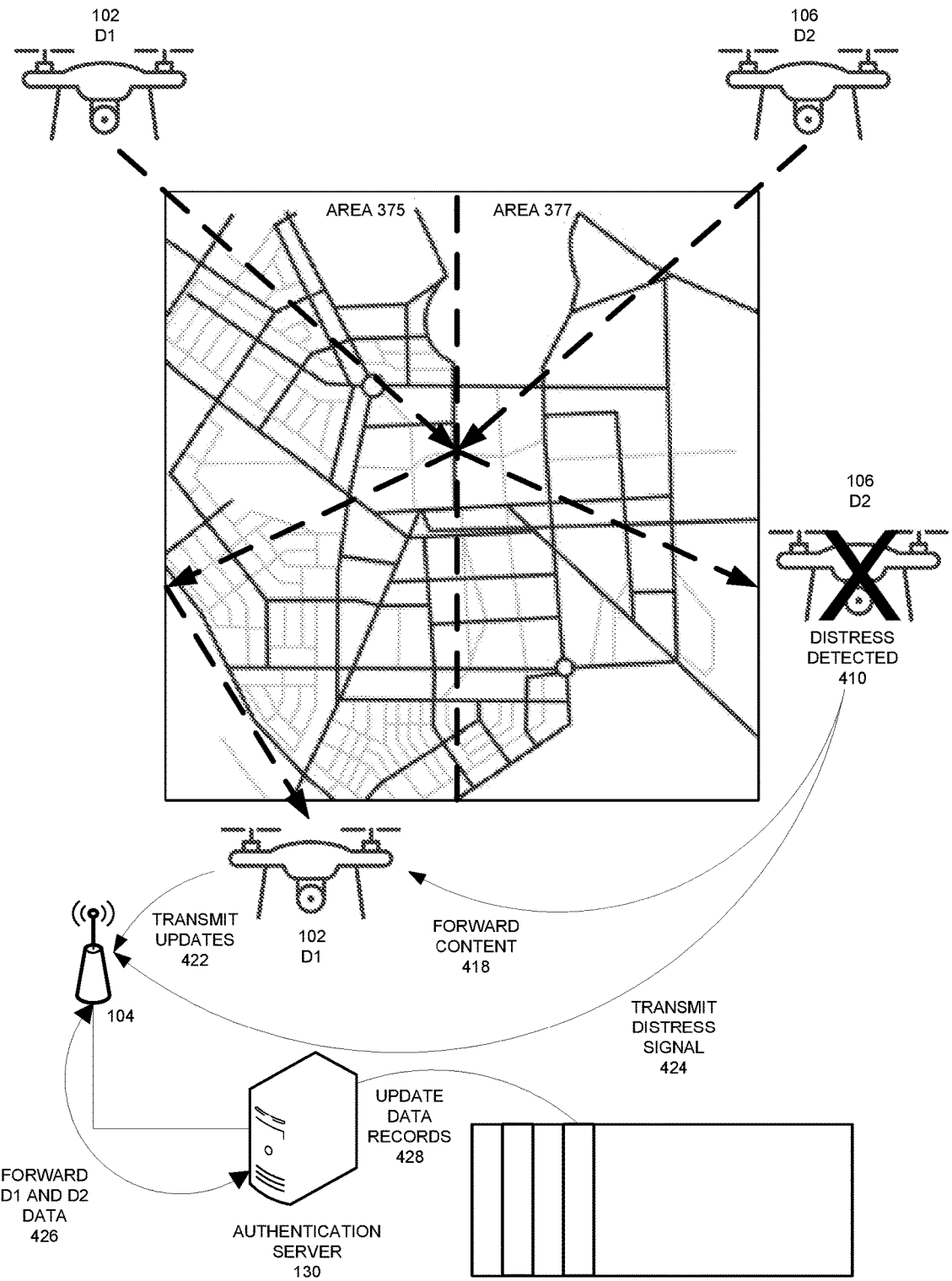
FIG. 4B illustrates multiple drones performing mission tasks assigned to each specific drone and one drone is undergoing distress mitigation operations according to example embodiments.

FIG. 4B illustrates multiple drones performing mission tasks assigned to each specific drone and one drone is undergoing distress mitigation operations according to example embodiments. Referring to FIG. 4B, configuration 450 provides the distressed drone 106 may enter a distress mitigation procedure once the distress is detected 410 and may attempt to communicate with the other drone(s) 102 and forward any content stored on the drone 106 with the drone 102. The drone 102 may attempt to share the information with the ground station via access point 104 which forwards any drone related data 426 to the authentication server 130 for updating data records 428 in the blockchain 140. The drone 106 may also attempt to transmit a distress signal 424, and/or a time-based liveness/heartbeat signal, directly to the ground station (e.g., access point 104, authentication server 130 or any Particular computing device in communication with the drones). The drone 106 may be preparing for a data purge in which all data stored on the drone is erased or re-encrypted to ensure security measures are in place prior to being captured by an adversary.

Figure 4C:
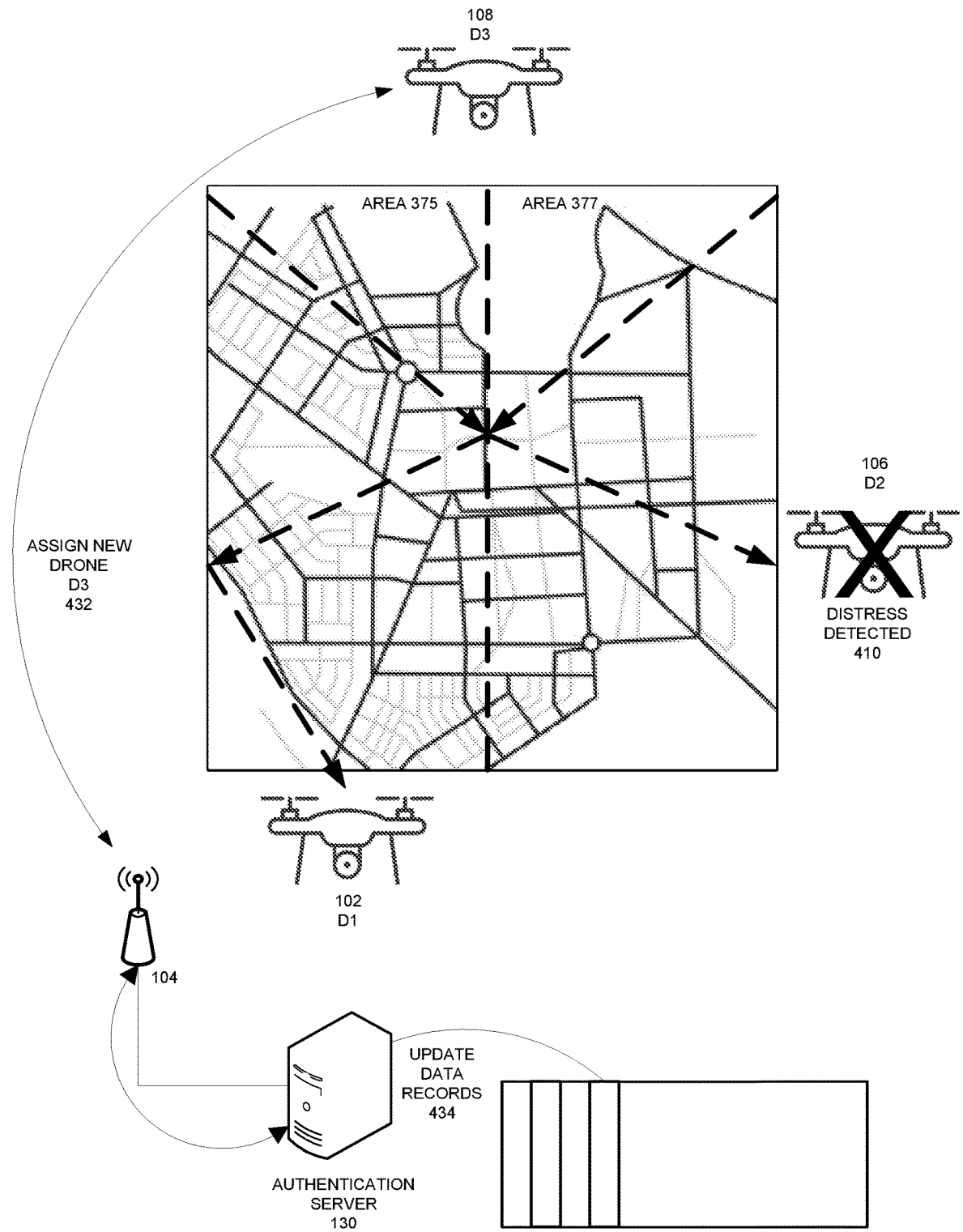
FIG. 4C illustrates multiple drones performing mission tasks assigned to each specific drone and a new drone is being assigned to replace the distressed drone according to example embodiments.

FIG. 4C illustrates multiple drones performing mission tasks assigned to each specific drone and a new drone is being assigned to replace the distressed drone according to example embodiments. Referring to FIG. 4C, the configuration 470 demonstrates that when the distressed drone event 410 has occurred a new drone 108 may be assigned 432 by the management entities, such as authentication server 130 and records 434 may be updated in the blockchain 140 to include the new drone identifier and other drone information along with an active token assigned to the new drone 108 which is intended to replace drone 106.

Figure 4D:
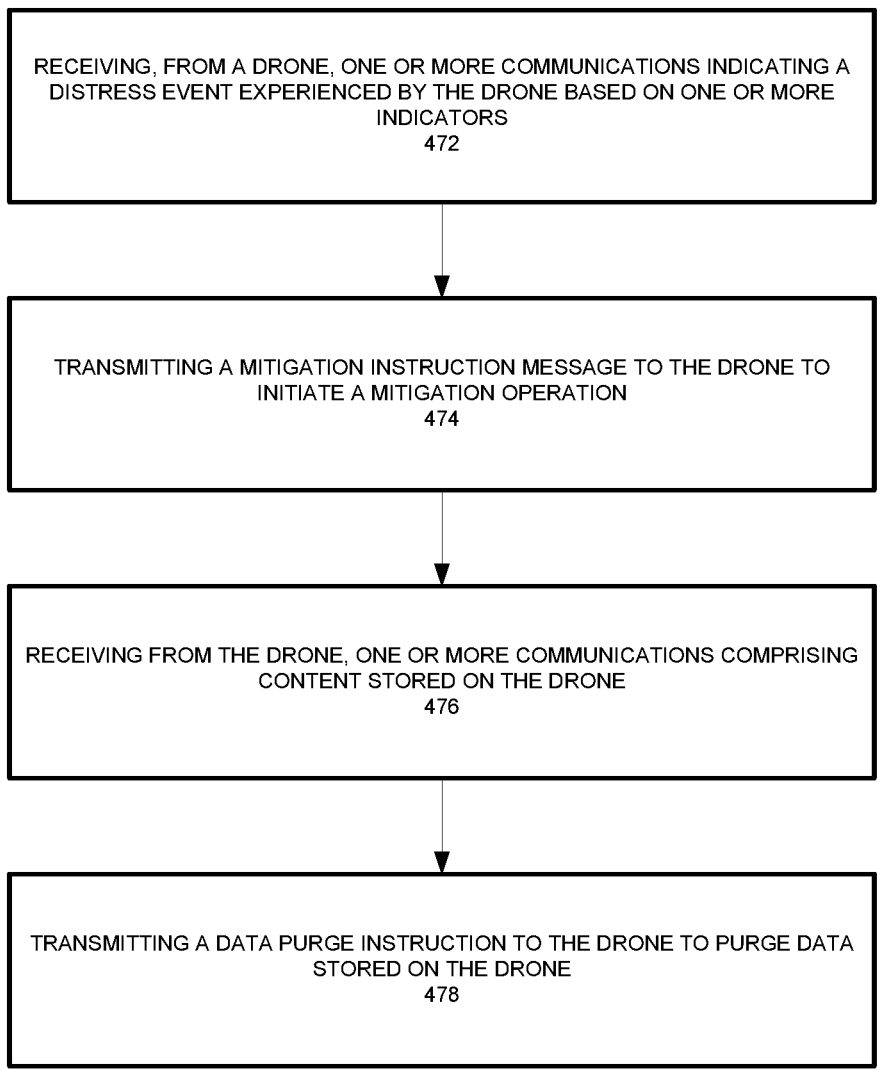
FIG. 4D illustrates an example process of performing a drone mitigation operation according to example embodiments.

FIG. 4D illustrates an example process of performing a drone mitigation operation according to example embodiments. Referring to FIG. 4D, the process may include receiving, from a drone, one or more communications 472 indicating a distress event experienced by the drone based on one or more indicators, such as the sensor data or other data. Transmitting a mitigation instruction message to the drone to initiate a mitigation operation 474. The mitigation instruction may be self-initiated by the drone in distress, a leader drone or via the ground station. The process may also include receiving from the drone, one or more communications such as content stored on the drone 476, and transmitting a data purge instruction to the drone to purge data stored on the drone 478.

One or more indicators may include a change in battery status, a loss of power, an unauthorized access attempt, a change in altitude, a change in location, a vibration sensor indication, a temperature sensor indication, an accelerometer indication and a gyroscope indication. The mitigation operation includes one or more of changing a communication frequency of the drone, temporarily ceasing communications, purging data stored in memory on the drone, transmitting data to a ground station or another drone, releasing a current mission, and assigning the current mission to another drone. The process may also include releasing a token assigned to the drone, transmitting a distress alert to another drone, receiving a confirmation response from the another drone, and transmitting the content stored on the drone to the another drone and receiving a distress alert at the ground station, transmitting a confirmation response from the ground station, and receiving the content stored on the drone at the ground station.

Another example embodiment may include the drone performing its own distress mitigation operations without ground control operation and/or other drones being used to initiate the operations. The process may include detecting, via a drone, a distress event based on one or more indicators, initiating, via the drone, a mitigation operation, attempting to transmit, via the drone, one or more communications comprising a distress alert and content stored on the drone to another device, and performing a data purge, via the drone, of data stored on the drone to satisfy the mitigation operation.

Figure 5:
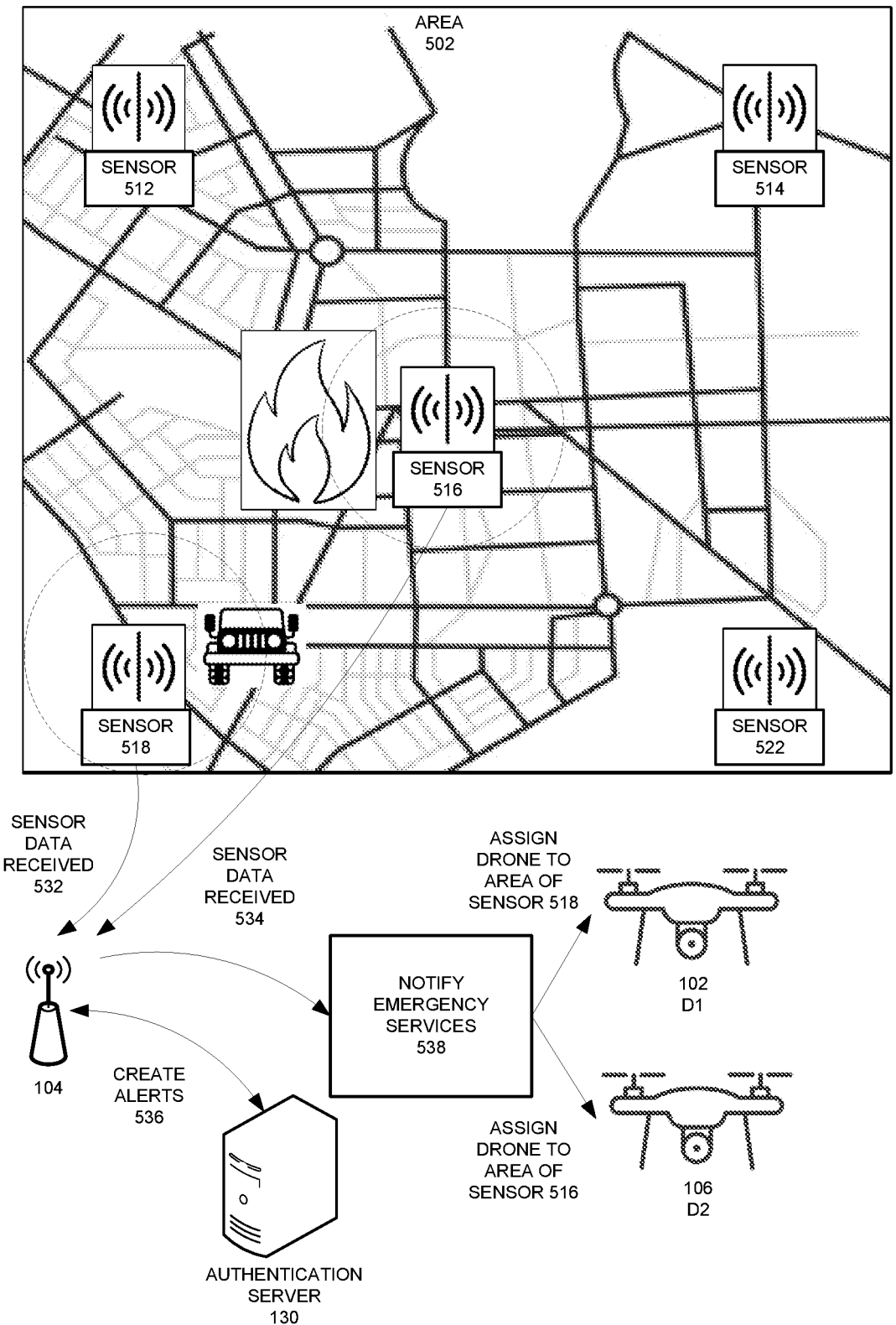
FIG. 5 illustrates an example of sensors being used to detect events and report to a drone dispatch operator according to example embodiments.
Figure 6A:
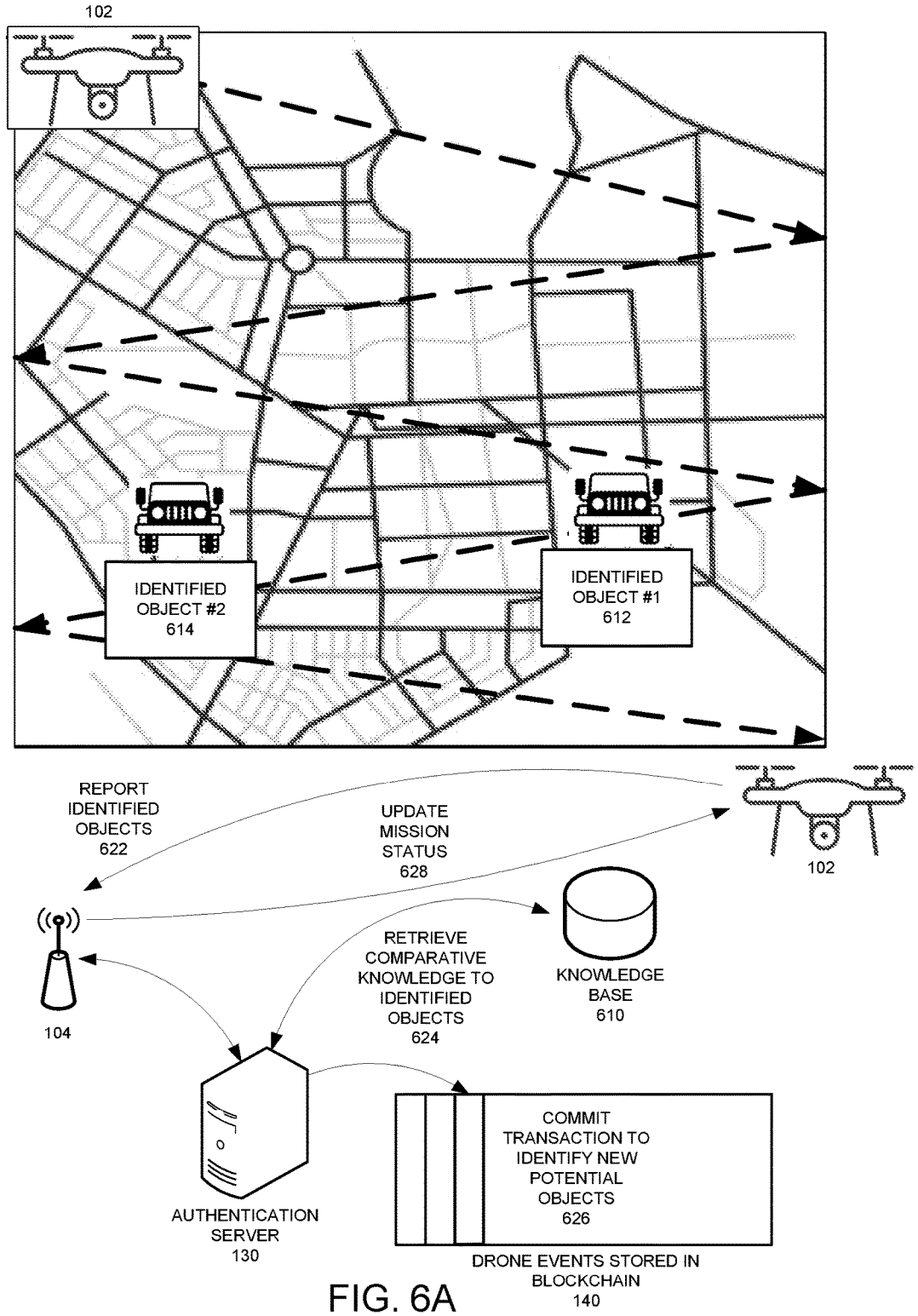
FIG. 6A illustrates an example process of a drone performing a mission and using the captured information to make predictions based on artificial intelligence according to example embodiments.

FIG. 5 illustrates an example of sensors being used to detect events and report to a drone dispatch operator according to example embodiments. Referring to FIG. 5, the configuration 500 includes a designated area 502 which includes various smart sensors 512-522. The sensors may be an array of sensors, such as temperature, noise, light, vibration, etc., which are placed in strategic locations to track activity remotely by cellular, radio and/or other types of communications linked to the sensors which are battery operated and which may use solar or other ways to generate energy to maintain an active status. The sensor data may be periodically sent from any of the sensors to a control station, such as authentication server 130, an emergency service station 538, etc. The sensor data 532 in one example may indicate a particular vehicle is present at a location detected by sensor 518 where vehicles are not regularly present, such as a national park after hours or private property, etc. Other sensor data 534 may be received indicating that a fire is present at a location being monitored near sensor 516. The alerts can be created by the authentication server 130 which maintains a record of valid sensors and alerts. The authentication server 130 may notify an emergency service center 538 to dispatch one or more drones 102/106 to the areas of interest identified. This approach Permits the drones to be dispatched on an as-needed basis without requiring continuous missions being conducted to monitor remote locations, FIG. 6A illustrates an example process of a drone performing a mission and using the captured information to make predictions based on artificial intelligence according to example embodiments. Referring to FIG. 6A, the example 600 includes a drone 102 being assigned a mission to fly in a particular pattern over a designated area to identify certain objects of interest. The result of the mission may include identifying one or more ground vehicles 612 and 614. The locations of the vehicles may be identified as well as types of vehicles and other information. In this example, the vehicles may be identified from image data and paired with known military grade vehicles to achieve a particular result, such as a threat level or threshold which may invoke further action.

The drone 102 may report the identified objects 622 to a ground station which may perform an artificial intelligence procedure to further investigate the data provided and whether mission updates are necessary to further the original mission objectives. A knowledge-base 610 may be stored on the drone 102 but preferably may be stored in a remote server or even on the blockchain 140. The data captured can be analyzed based on or more intelligence algorithms which attempt to perform a comparative analysis 624 of the inputted data. Any conclusions can be committed to the blockchain 626, such as additional objects which are likely to be present within a predefined area of the original objects. This will invoke an additional mission measure to perform additional monitoring for a specific area between the objects as dictated by the intelligence algorithm based on known information. The updated mission data 628 is then sent to the drone 102.

Figure 6B:
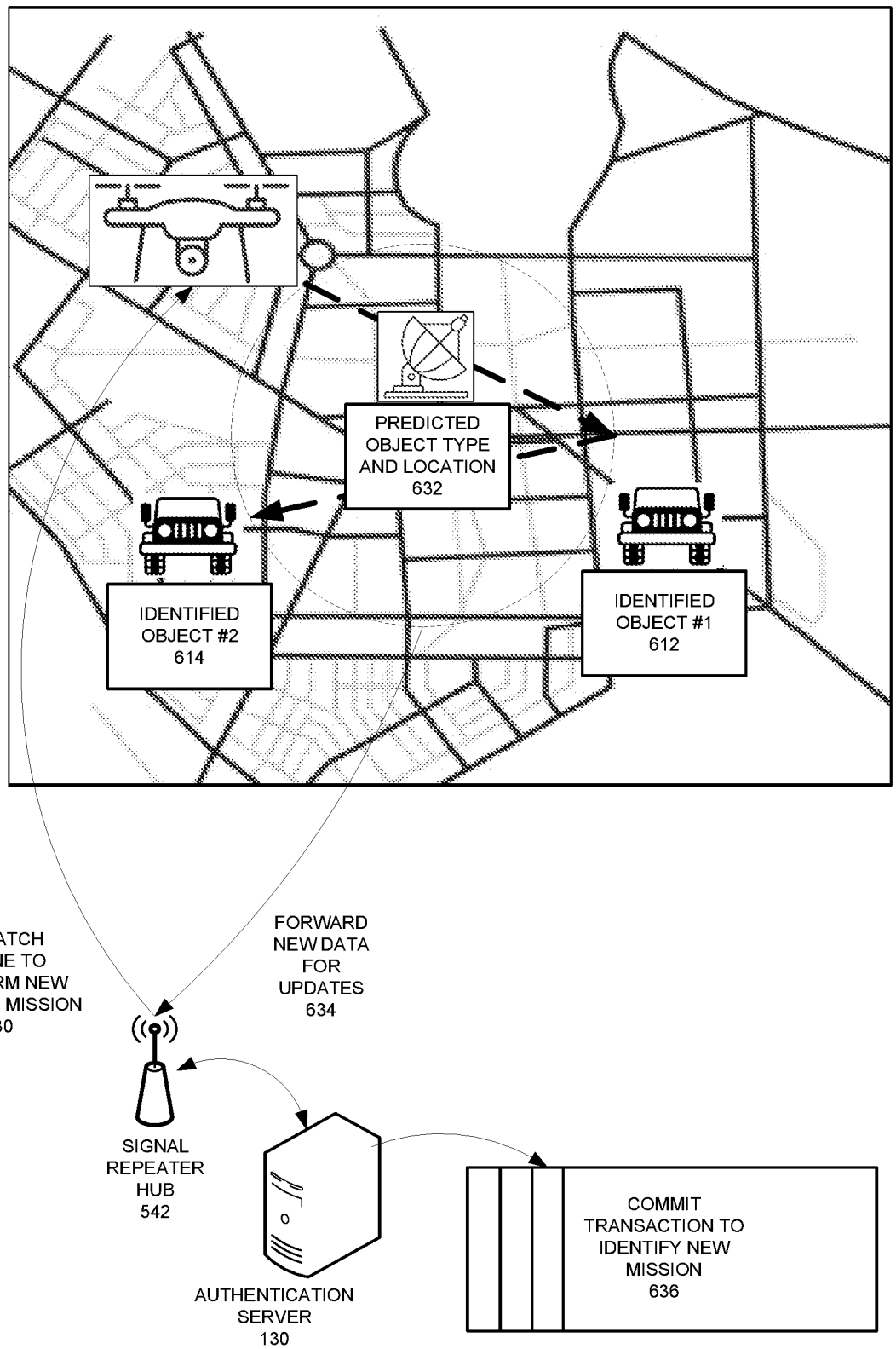
FIG. 6B illustrates an example process of a drone performing a modified mission based on the predictions and applied artificial intelligence according to example embodiments.

FIG. 6B illustrates an example process of a drone performing a modified mission based on the predictions and applied artificial intelligence according to example embodiments. Referring to FIG. 6B, the configuration 650 demonstrates how the drone is dispatched 630 to new mission area defined by the intelligence analysis to locate a likely candidate object 632. In this example, a number of identified military vehicles would invoke a likely presence of a radio communication station somewhere between the objects in a predefined area. The intelligence algorithm could predict any type of candidate object associated with the identified objects 612/614 and instruct the drone to seek additional data content in a predefined area also likely to be the location of such objects as predicted by the intelligence algorithm. The new updates 634 may be sent from the drone to ground station to be further analyzed in a subsequent intelligence analysis procedure, which could yield additional mission updates and further modifications to existing mission objectives. Updates 636 can be maintained in the blockchain and may be used with the smart contract data to define a next mission.

Figure 6C:
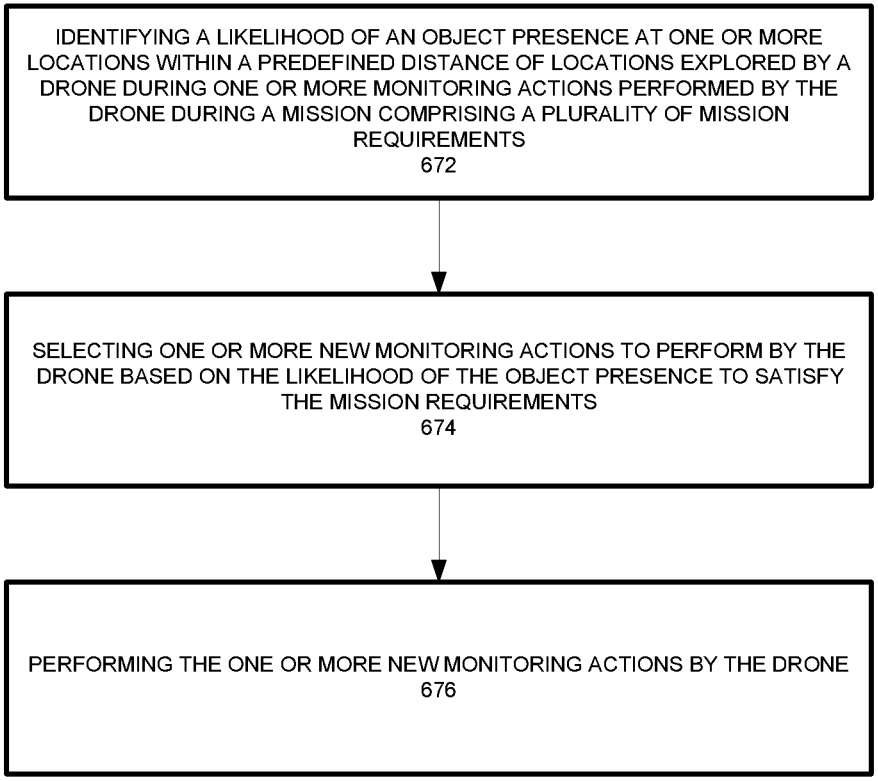
FIG. 6C illustrates a flow diagram of an example process of a drone performing a modified mission based on the predictions and applied artificial intelligence according to example embodiments.

FIG. 6C illustrates a flow diagram of an example process of a drone performing a modified mission based on the predictions and applied artificial intelligence according to example embodiments. Referring to FIG. 6C, the drone may be monitoring an area and perform an intelligence operation to determine another object is likely present and then decide to do additional monitoring or modified monitoring. The known information is used to predict certain results and the smart contract may be updated for a new mission objective once a decision is made regarding the validity of the intelligence analysis.

One example process may include identifying a likelihood of an object presence at one or more locations within a predefined distance of locations explored by a drone during one or more monitoring actions performed by the drone during a mission comprising a plurality of mission requirements 672, selecting one or more new monitoring actions to perform by the drone based on the likelihood of the object presence to satisfy the mission requirements 674, and performing the one or more new monitoring actions by the drone 676. The one or more monitoring actions may include one or more of communication signal detection and an image capture being performed at the locations explored by the drone, or at new locations determined to be relevant to the previous locations of the identified objects, such as within a predefined radius between the objects or adjacent to the one or more objects. The mission requirements include one or more of identifying objects at the locations explored by the drone and monitoring communication signals at the locations explored by the drone. The process may also include identifying the likelihood of an object presence at one or more locations within the predefined distance of the locations explored by the drone by performing a comparative analysis of the objects previously identified at the one or more locations with candidate objects which are known to be associated with the objects previously identified, and determining the likelihood of the candidate objects also being present exceeds a threshold based on the comparative analysis. The analysis may yield a percentage of likelihood, such as 85 percent and the threshold for action may be 80 percent indicating the action should be performed based on the likelihood score. The process may also include creating an instruction to perform one or more of additional image captures and communication signal monitoring at the locations within a predefined distance of the locations explored by the drone when the threshold is exceeded. The process may also include determining a range of the locations within the predefined distance of the locations explored by the drone based on a distance between two or more objects detected during the monitoring of the locations explored by the drone, monitoring the locations within the predefined distance of the locations explored by the drone for a predefined period of time and performing the additional image captures to identify the candidate objects, and performing an image analysis of the additional image captures to identify the one or more candidate objects. The process may also include updating the mission requirements to include additional monitoring actions including the identified known objects when the candidate objects are identified.

In general, drones could only be registered (authorized) for operation by an owner/designee. Authorized drones could only be tasked by an owner/designee. Every authorized drone should send a live signal (announcing current location and state) at a specified frequency while the drone is tasked or operating on a mission. Drone data could be remotely wiped when the drone is experiencing a distress event (e.g., captured by an unauthorized entity), when a distress signal is sent, when the drone is unable to send a live signal at a specified frequency, or when the drone veers out of an authorized geo-location.

Each drone may have a unique serial number, an encrypted hardware key, and an encrypted memory store. Each drone's unique identifier is a software key, which is a combination of a serial number and the encrypted hardware key, each drone's memory will be programmed to be erased after a set time in case of any distress events encountered. Each drone may be programmed to send location, status, and any authorized data at set intervals when operating on a task/mission. A tasked drone's memory may be erased within a pre-programmed time following identified distress events.

A blockchain (public or private or combination thereof) platform provides an immutable ledger with events that abide by set smart contracts that detail drone operational rules to ensure secure operation. For example, all serial numbers and encrypted hardware keys may be registered in the blockchain by an owner/designee. Each drone will be registered by the owner/designee to generate its unique identifier, Only an owner/designee could change combinations of serial number and encrypted hardware key to generate a new unique identifier. Drones can be retired at an end-of-life cycle by the owner/designee. Only an owner/designee can task a registered drone by posting an event linked to the unique identifier in the blockchain. An authorized drone will acknowledge a task assigned by an owner/designee before starting the task. Live signal information (e.g., status, location, and any other authorized data) sent by a tasked drone may be accompanied by its unique identifier.

The blockchain may execute certain operations before posting the live signal and end of task events, verify and validate authenticity of the unique identifier of the drone and its task instructions, execute a programmed consensus algorithm to validate and commit the live signal and end of task events information, only owner/designee will be able to alter tasks during middle of task.

Some fundamental drone attributes may include a drone serial number, an encrypted hardware key, an encrypted memory. Other network elements of the drone configuration may include a blockchain with an immutable ledger to post events, smart contracts with drone operational rules, identity and task validator components, a signal repeater (hub) to facilitate sharing of drone-hyperledger communications, and an owner/designee that is an authorized user or a system that is allowed to register and task drones.

In a future mission, the drones may be equipped with advanced sensors and artificial intelligence (AI) capabilities that enables them to autonomously detect and track certain targets that they did not have knowledge of and which are not present in their usual flight patterns. The architecture can be further enhanced to incorporate secure AI model training and deployment by using techniques such as homomorphic encryption to ensure that the AI models and their data remain secure and private even if the drones are compromised. One example of this may include creating a new flight pattern to identify an object which is not previously identified based on the presence of other objects which were identified. For example, a certain type of vehicle may create an artificial intelligence measure that determines there are likely other vehicles of the same type, or a communication station within a predefined distance of the identified vehicle location based on a prior knowledgebase.

In a scenario where a drone is lost or destroyed, the architecture can include mechanisms for remote data purge instructions or destruction of sensitive data and AI models stored on the drone's hardware. The drone may enact such measures on its own or by instruction from a ground station or other drone that is aware of the drone's current distress.

The AI measures used by the drones may include convolutional neural networks (CNNs), which are a type of deep learning algorithm commonly used for image and video analysis. Drones equipped with high-resolution cameras and sensors can use CNNs to identify and classify objects in their environment, such as third party vehicles or personnel. This can help the drone to detect and track potential threats, and provide valuable intelligence to alliance entities nearby. In the context of countering cyber or Offensive drone attacks, CNNs can be used to identify and track incoming drones in real-time. This can help personnel to quickly respond to potential threats and deploy defensive measures to neutralize the attack.

Recurrent neural networks (RNNs) are a type of deep learning algorithm that is commonly used for natural language processing and sequential data analysis. In the context of military drones, RNNs can be used for tasks such as speech recognition and language translation. For example, a drone equipped with an RNN could be used to intercept and analyze enemy communications and provide real-time translations. RNNs can also be used to detect and classify patterns in data, such as the movement patterns of third party drones or the behavior of cyber attackers.

Generative adversarial networks (GANs) are a type of deep learning algorithm that can also be used for generating synthetic data. In the context of military drones, GANs can be used to generate synthetic images and videos of potential targets, such as third party facilities, bases and/or vehicles. This can help personnel develop and test strategies for neutralizing these targets without harming drones or personnel. GANs can also be used for training other AI models, such as CNNs or RNNs. By generating synthetic data that mimics real-world scenarios, LANs can help to improve the accuracy and robustness of these models and ensure that they are able to perform effectively in a variety of different environments and situations, By enabling drones to detect and classify potential threats, intercept and analyze third party communications, and generate synthetic data for testing and training, these models can help optimize the effectiveness and safety of field operations in a variety of different contexts.

An intrusion detection system (IDS) may use CNNs to detect cyber attacks on the drone network, and the output can be used to trigger the revocation and re-allocation of ERC20 tokens. When an intrusion is detected, the monitoring system can trigger the token revocation process that revokes the ERC20 tokens associated with the compromised drone's wallet or data entries. This ensures that the compromised drone cannot participate in any communication or transactions in the network, and that the trust level of the network remains high.

Image recognition may use a neural network, such as 'ResNet50' to detect and classify potential threats to the drone network, such as third party drones or other hostile activities. The output of the model can be used to trigger the transfer of ERC20 tokens to other trusted drones, ensuring that the network is able to respond to threats in a timely and effective manner. When a drone is under distress, the mission will benefit from another drone taking over the distressed drone's activities. Assignment and reassignment may be dynamic and automated by actions stored in a drone and/or in a smart contract that defines the actions to take under distress scenarios.

During a mission, a path planning algorithm, such as 'A*' can be used to plan the optimal flight path for the drone, considering locations of potential threats and the need to avoid detection. The output of the algorithm can be used to trigger the transfer of ERC20 tokens to other trusted drones that can assist in the mission, ensuring that the network is able to respond to changing mission requirements. As threats are identified, the drone's mission operative may be assigned, reassigned, cancelled, postponed, etc. Overall, the use of ERC20 tokens in conjunction with AI models can enhance the security of drones by ensuring compromised drones are not able to participate in the network, and that the network can respond to threats and changing mission requirements in a timely and effective manner.

Types of blockchains may include public, private (permissioned), etc. Also, layer 2 'rollups' may be used to maintain performance requirements when deciding which blockchain technology to use. While public blockchains may be suitable in some cases, layer 2 'rollups' can offer better performance and lower costs and provide a smart contract approach to managing the blockchain transactions and objectives. An abstraction layer may be used for drone management by creating an abstraction layer that handles all interactions between the drones and the blockchain. This layer should manage drone identity, configuration, and supply chain information, and will permit for secure communication between the drones and the blockchain. Standardized APIs may be used for drone management by interacting with the abstraction layer. These APIs should include functions for registering new drones, first time use, updating drone configurations, tracking supply chain information, and verifying drone identity. Client libraries may implement the standardized APIs for different Programming languages and platforms. The libraries can be used by drone manufacturers, operators, and other stakeholders to manage drones in a secure and decentralized manner. The abstraction layer may be used for drone data storage to create another abstraction layer that handles the storage of drone data on the blockchain. This layer should be responsible for managing the storage and retrieval of drone data, including telemetry data, flight logs, and maintenance records.

Standardized APIs define standardized APIs for drone data storage that can be used to interact with the abstraction layer. These APIs may permit for the secure storage and retrieval of drone data, and should include functions for querying data, adding new data, and verifying the authenticity of stored data. Client libraries may be used to implement the standardized APIs for different programming languages and platforms. These libraries can be used by drone operators and other stakeholders to securely store and retrieve drone data on the blockchain. The operator or an autonomous entity may need to verify one or more identities before accessing any weapon systems on the drone. A standardized API can be used to activate or deactivate various drone features such as a camera, a radio transceiver, a microphone, sensors, one or more weapon systems (missile launching, flame throwing, etc.) as well as view logs of previous weapon system activities. If the drone is communicating over a low earth orbit (LEO) network, such as 'Starlink', additional security measures may be necessary to protect the weapon system data as information is propagated through the private network. For example, a security layer for weapon systems should include access controls to ensure that only authorized operators can access the weapon systems. If the drone is communicating over a LEO network, the security layer should include encryption and data validation to ensure that any weapon systems data is protected. The security layer for weapon systems should include access controls to ensure that only authorized operators can access the weapon systems. If ERC20 is used to authenticate the operator's identity, the security layer may include a mechanism for validating the operator's ERC20 token and verifying that it is associated with their respective public key.

In the case of a particular user operator, the user may need to verify their identity before accessing any navigation data on the drone. They can then use the standardized API to view the drone's current location, flight plan, mission data, and telemetry data. If the drone is communicating over a LEO network, the operator may need to use additional security measures to protect its navigation data as it transmits through the network. The security layer for navigation may include access controls to ensure that only authorized operators can access the navigation data. If the drone is communicating over a LEO network, the security layer may include encryption and data validation to ensure that the navigation data is protected.

In addition to drone-to-drone (D2D) communications, vehicle-to-vehicle (V2V) communication may be used where certain strategic vehicles could be equipped with onboard devices that permit for direct communication to and from other vehicles in a certain proximity. The communications could be used to share traffic information, environmental conditions, and/or to coordinate actions, such as platooning where a group of vehicles follows closely behind a lead vehicle to reduce wind resistance and save energy. Another approach may be vehicle-to-infrastructure (V2I) communication, where vehicles may also communicate with local infrastructure such as traffic signals, road sensors, or local edge computing devices. This could permit for a higher level of interaction with the local environment and provide additional data to support autonomous operation. In both those vehicle examples, the interactions could be recorded as transactions on a blockchain. This could provide an immutable record of the vehicle's actions and observations, which could be useful for dispute resolution in the event of an accident, verifying the authenticity of sensor data, or tracking the use of shared infrastructure. Vehicles may also communicate to drones to provide a dynamic option to a variety of different field devices which are working together to accomplish a common goal(s). The roles, leaders, Permissions and mission operatives may be shared from drone to vehicle and all such devices may communicate. Vehicles may be preferred in certain areas where ground activity is necessary and when travel becomes burdensome, the drones may exit the vehicles and fly away to continue the journey and mission operatives. The drones may be extensions of the vehicles and may share a common role or position where one is active and the other is inactive depending on the current situation.

In another example, in an outer space travel mission, a spacecraft, 'Omega', may be operating on a long-duration mission with a crew. To ensure the crew's safety, various mission-critical operations are encoded as smart contracts on an Ethereum-like blockchain, Health monitoring may be performed by a central communication device maintaining a record for each crew member wearing a device that continuously monitors their vital signs. If a significant anomaly is detected in any one of the crew members based on a specific baseline of vital health conditions, a blockchain transaction may be triggered based on criteria defined by the smart contract, which initiates a predefined response protocol alerting the crew's medical officer, adjusting the environmental conditions, etc.

In another example, equipment maintenance may be tracked and monitored for all onboard equipment that is Internet of things (IOT)-enabled and which continuously reports its status to a central device. If a critical failure is detected based on baseline criteria defined by a smart contract, then the smart contract may initiate a repair protocol by sending instructions to a 3D printer to create the required spare part or alert the crew to perform the necessary repairs. Also, the inventory of food, medicine, and other supplies may be tracked on the blockchain. If supplies run low, a smart contract is triggered that initiates rationing and/or which triggers an emergency resupply mission from Earth.

In another example, 'Delta' and 'Epsilon', are two autonomous deep-space probes. Delta specializes in cosmic particle detection, while Epsilon carries advanced equipment for astrophysical measurements. These probes are programmed to conduct separate investigations and rendezvous at defined intervals to synchronize their data with a central point and/or with one another and optimize the information sent back to Earth and conserve valuable bandwidth.

Assuming Delta and Epsilon are two deep-space probes equipped with adaptive machine learning models, Delta may detect cosmic particles, and Epsilon may perform astrophysical measurements. Both entities are programmed to learn from their past experiences and adapt their current operations accordingly based on known data and currently identified data. When a primary communication system fails, the entities may resort to a blockchain-based protocol. Delta may detect a cosmic particle anomaly and generate a task request for Epsilon, formatted as a blockchain transaction. Delta's machine learning model, having analyzed past similar events and Epsilon's responses, may create the request to increase the likelihood and quality of Epsilon's data. Epsilon receives the request and uses its machine learning model to evaluate the request against its current mission plan and resources. The model, having learned from past task performances, might suggest modifications to increase the efficiency of the task. After the task completion and data exchange, both probe devices' machine learning models analyze the outcome based on the recorded blockchain transactions. They then update their models to improve future task assignments and performances. In both scenarios, the blockchain's immutability provides a data source for the machine learning models and also provides reliable historical data for analysis and learning by ensuring the transparency and accountability of the learning process since all changes proposed by the models and their impacts are recorded.

The probes may also be designed to adapt their mission plans based on certain findings. For instance, if Delta detects an unusual cosmic particle event, it might task Epsilon to adjust its measurements to provide corresponding astrophysical data. For example, if a primary task assignment system, managed by a ground station on Earth, fails due to an unexpected technical issue, a decentralized blockchain-based system could now serve as a failsafe approach to maintaining data for the system. If Delta detects a cosmic particle anomaly and decides additional astrophysical data would be valuable, it may generate a task request, structured as a blockchain transaction, detailing the requested measurements and the time frame. Epsilon may receive the request, and evaluate the request against its current mission plan and energy resources, and decide it's capable of performing the task. Epsilon then sends an acknowledgement transaction, indicating it will perform the requested task. Both spacecraft are configured to validate transactions due to the lack of a large network of peers in deep space. They can then verify the request and perform an acknowledgement transaction of authenticity by signing them and adding them to their blockchain. Epsilon performs the additional measurements according to the agreed-upon parameters. The measurements are completed and recorded in a new transaction and validated by both spacecraft. Once Delta and Epsilon rendezvous and communicate, they exchange their data. The successful data exchange is recorded as another transaction on the blockchain, providing an immutable record of the completed task. Once communication with Earth is restored, the series of transactions detailing the task request, acknowledgement, completion, and data exchange can be sent back to Earth. This not only provides the mission control with valuable data but also provides an immutable log of the autonomous decisions made by the probes.

In this scenario, the blockchain-based system enables Delta and Epsilon to continue their mission and even adapt to new findings, despite the failure of the primary task assignment system on Earth. The decentralized nature of the system and the blockchain's immutability ensure transparency, accountability, and reliability in the probes' operations, even when significant communication latency and technical failures are experienced.

In another example, a team of autonomous submarines, for example, 'Alpha', 'Beta', and 'Gamma', may be operating on a mission to explore the Mariana Trench. The system of submarines may employ an ERC20-based blockchain system to ensure their safety and seamless operation. The submarines may continuously share their location, status, and the environmental conditions with each other. If a submarine (e.g., Alpha) reports dangerous conditions or an equipment failure, smart contracts can be triggered to adjust the mission plan, potentially assigning tasks previously assigned to Alpha, to Beta and/or Gamma. If a submarine loses communication with one or more of the other submarines, a blockchain transaction could be automatically generated to trigger a search and rescue operation. The other submarines could be redirected to the last known location, and a drone could be deployed from a surface support vessel to assist underwater. The submarines may communicate with one central submarine or a device above or below water that is provided the communication point to and from the ledger.

All the data collected by the submarines may be time-stamped and stored on the blockchain, ensuring the accuracy and integrity of the data. This can be critical for post-mission analysis, especially if an accident or equipment failure occurs.

Other devices in the network, such as fixed sensors may act as validators and confirm the authenticity of the transactions and add them to the blockchain. In a traditional blockchain network, this would be performed by miners. Here, proof-of-authority or proof-of-stake systems can utilize certain trusted devices to validate transactions. Once the transactions have been validated and added to the blockchain, the submarines may execute the docking procedure according to the agreed terms. Each operation of the procedure is confirmed with a new transaction, providing an ongoing record of the operation. Once the docking procedure is complete, a final transaction is made to confirm the successful completion of the operation. This transaction might also include additional data, such as the amount of energy transferred during the recharge process or a hash of the data exchanged.

In the example with two autonomous underwater research submarines which are designed to dock together to exchange data and recharge their power systems, those entities can be part of a broader underwater sensor network, where the submarines collect data from fixed sensors and then meet to exchange and synchronize their data. In one example, the primary communication protocol for coordinating this docking procedure may rely on a centralized underwater communication relay, but that relay may go offline due to a technical fault or other disruption. The decentralized blockchain-based system might provide a way to maintain the system integrity. Each submarine may be equipped with a short-range, peer-to-peer communication system. The submarines may use this communication system to broadcast their presence and status on a local level with one another. The submarines may also be Pre-configured to recognize each other's blockchain addresses, allowing them to establish a secure communication channel by authorizing one another prior to agreeing to perform data exchanges.

Using a secure communication channel, the submarines may negotiate the terms of their docking procedures. This may include relative Positions, speeds, and the sequence of operations to be performed during the docking. The terms are encoded into a series of blockchain transactions. The blockchain-based system permits the submarines to continue their operation even when the primary communication protocol fails. The decentralized nature of the system means that no single point of failure can disrupt the entire operation, and the immutability and transparency of the blockchain provides a reliable record of the operation. In the example of two autonomous underwater research submarines, 'Alpha' and 'Beta', collecting data from different regions of the ocean. The entities are equipped with machine learning models to adapt their operations based on patterns in their collected data and experiences. For example, during one of their rendezvous events where they share information and communicate with one another and/or a central point, the main communication relay may go offline. A blockchain-based system may be used as a failsafe way to secure the information. Alpha and Beta may establish a secure, direct communication channel using their onboard short-range communication devices and blockchain addresses. Both submarines may negotiate docking procedures, embedding the terms of the agreement into a series of blockchain transactions. Simultaneously, their machine learning models may analyze past docking experiences, such as data about the current state of the ocean, and other contextual factors which were logged and stored. Based on this analysis, they might propose adjustments to the docking procedure to improve its efficiency or success rate based on current data and known data. Following the docking event, the submarines' machine learning models analyze the success and efficiency based on the immutable record on the blockchain. They may then update their current information models to improve future dockings as part of the artificial intelligence.

A consortium of drone manufacturers, industry experts, and regulatory bodies may collaborate to establish a decentralized network using blockchain technology. The network may create a standardized communication protocol, ground station management system, swarm management capabilities, and heartbeat integration for drones. Each drone manufacturer can register their drones on the blockchain network, providing essential information such as drone specifications, capabilities, and communication protocols. The blockchain assigns a unique identity to each registered drone, ensuring traceability and authenticity. Drones also generate public-private key pairs for secure communication. Similarly, operators of ground stations may register their stations on the blockchain network, providing information about their location, technical infrastructure, and capabilities. This registration process ensures transparency and accountability in the management of ground stations. The consortium may develop a standardized communication protocol for drone-to-ground station interactions. The protocol defines data exchange formats, message structures, encryption mechanisms, and also incorporates swarm management and heartbeat functionality and ensures secure and efficient communication between drones and ground stations.

Smart contracts may be implemented on the blockchain to facilitate communication and swarm management of various entities registered on the blockchain. The smart contracts manage drone registration, permission management, request handling, swarm formation, task assignment within swarms, and response validation. When a drone approaches a ground station, it initiates a communication handshake process. The drone broadcasts its identity and capabilities, and the ground station verifies the authenticity of the drone's identity through the blockchain network. Once authenticated, the drone and ground station establish a secure communication channel based on a standardized protocol. Heartbeat functionality is integrated where drones periodically send heartbeat signals to ground stations to indicate their operational status. Drones can form swarms for collaborative missions. Ground stations can assign tasks to swarms or individual drones through the blockchain network. Task assignments are recorded as blockchain transactions, specifying the nature of the task, time frames, and any required parameters. Drones within a swarm receive task assignments, validate them against their capabilities, and provide transaction acknowledgments on the blockchain.

Ground stations may monitor drone operations in real-time by tracking the progress of assigned tasks, monitor swarm formations, and ensure adherence to safety protocols. Swarm coordination is facilitated through the blockchain, which permits drones within a swarm to communicate, share information, and adapt their actions collectively. Heartbeat signals from drones are continuously monitored by ground stations to track their operational status, detect anomalies, and trigger appropriate actions.

The decentralized blockchain network enables collaboration among stakeholders for protocol enhancements and swarm management strategies. Through consensus mechanisms and governance models, blockchain stakeholders may propose and vote on protocol upgrades and swarm management approaches. Ground stations respond to heartbeat signals, permitting them to proactively identify and address any issues or failures in drone operations.

By incorporating swarm management capabilities and heartbeat integration into the blockchain-based solution, this scenario addresses the challenges of managing multiple drones operating collaboratively and ensuring their operational status. The standardized communication protocol, smart contracts, and heartbeat functionality provide a comprehensive framework for efficient and reliable coordination, monitoring, and response within drone swarms.

Adaptive learning using data models with the drones may require a standardized approach to have a full swarm management and heartbeat integration for formation algorithms, dynamic task assignment mechanisms, real-time coordination protocols, and appropriate response strategies for heartbeat anomalies.

Figure 7:
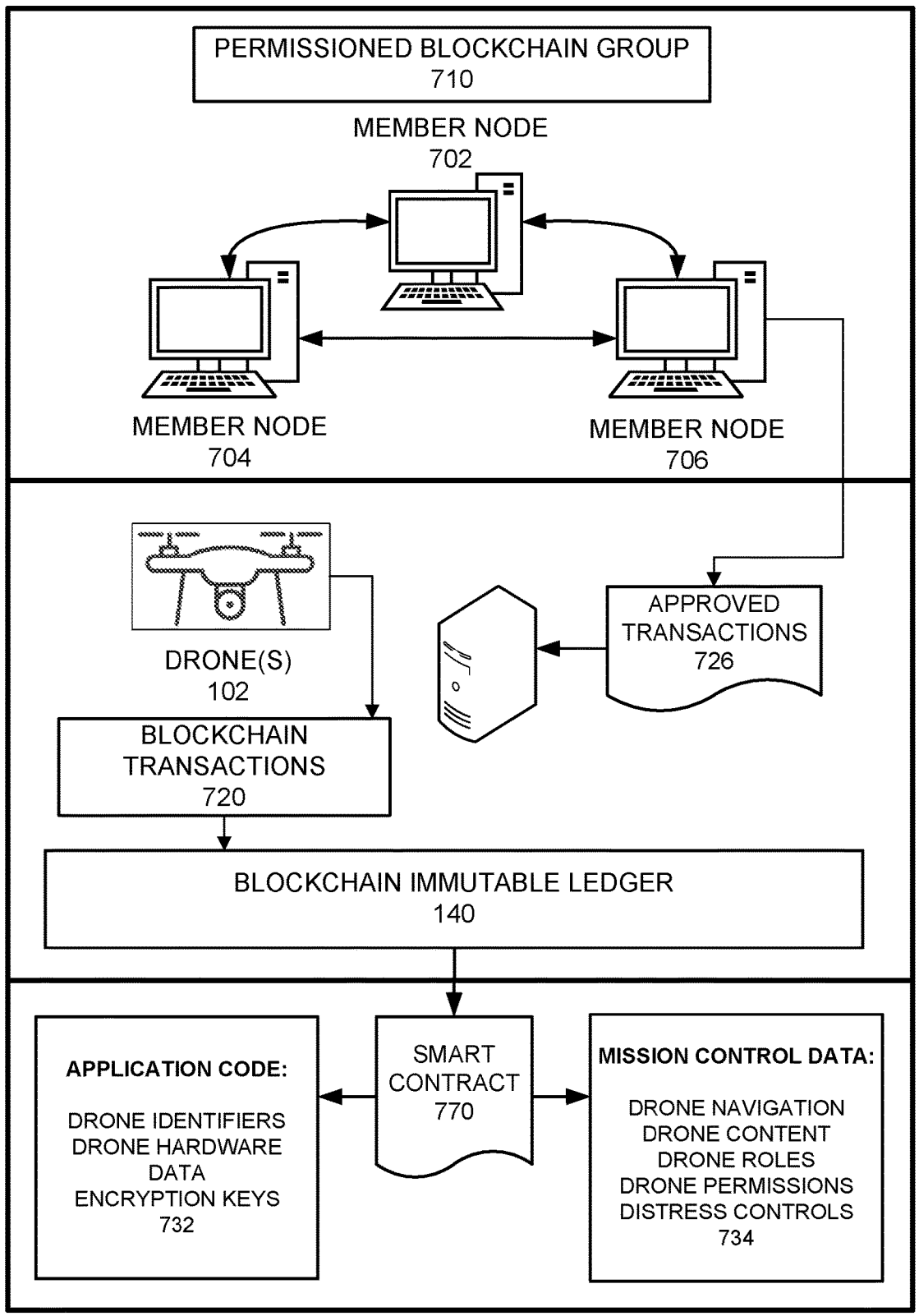
FIG. 7 illustrates an example blockchain architecture used to perform drone management according to example embodiments.

FIG. 7 illustrates a blockchain configuration used to receive and store blockchain transactions the drone events, according to example embodiments. Referring to FIG. 7, the configuration 700 may include certain blockchain elements, for example, a group of blockchain member nodes 702-706 as part of a permissioned blockchain group 710. The permissioned blockchain is not accessible to all parties but only to those members with permissioned access to the blockchain data. The blockchain nodes may include one or more nodes. The nodes may participate in a number of activities, such as blockchain entry additions and/or a validation process (consensus). One or more of the blockchain nodes may endorse entries based on an endorsement policy and may provide an ordering service for all blockchain nodes. A blockchain node may initiate a blockchain authentication and attempt to write to a blockchain immutable ledger stored in the blockchain.

Each time a drone event occurs, such as registration, status changes, authorization, mission assignment, updated content captures, discoveries, sensor readings by the drones or stationary sensor elements, etc., the blockchain transactions 720 are stored in memory of computers associated with the blockchain as the transactions are received and approved by the consensus model dictated by the members nodes. Approved transactions 726 are stored in current blocks of the blockchain and committed to the blockchain via a committal procedure which includes performing a hash of the data contents of the transactions in a current block and referencing a previous hash of a previous block. Within the blockchain may be smart contracts 770 which are configured to define the terms of transaction agreements and actions included in the smart contract executable application code 732.

The information used to create and establish drone assignments and events may be based on information sharing agreements to include permissions granted to share mission data and other drone related information with the authorized drones and any secure computing devices operating as part of the drone management system. In general, the smart contract information may include the drone serial number(s), encrypted hardware keys and other information stored in memory, and other information, such as mission data, objectives and other information necessary to command the drones including starting and stopping their operation, controlling drone positions, etc.

The blockchain configuration may include one or more applications which are linked to application programming interfaces (APIs) to access and execute stored program/application code (e.g., smart contract executable code, smart contracts, etc.) which can be created according to a customized configuration sought by blockchain participants to maintain status, control assets, and receive external information. This can be deployed as an entry and installed, via appending to the distributed ledger, on all blockchain nodes.

The smart contract application code provides a basis for the blockchain transactions by establishing application code which when executed causes the transaction terms and conditions to become active. The smart contract 730, when executed, causes certain approved transactions 726 to be generated, which are then forwarded to the blockchain platform. The platform includes a security/authorization, computing devices which execute the transaction management and a storage portion as a memory that stores transactions and smart contracts in the blockchain.

The blockchain platform may include various layers of blockchain data, services (e.g., cryptographic trust services, virtual execution environment, etc.), and a physical computer infrastructure that may be used to receive and store new entries and provide access to auditors which are seeking to access data entries. The blockchain may provide an interface that provides access to the virtual execution environment necessary to process the program code and engage the physical infrastructure. Cryptographic trust services may be used to verify entries such as asset exchange entries and to keep information private.

The blockchain architecture configuration of FIG. 7 may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., virtual machines) included in the blockchain layer. The result may include a decision to reject or approve the transaction based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code which is registered, stored, and/or replicated with a blockchain (e.g., distributed network of blockchain peers). An entry is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 8:
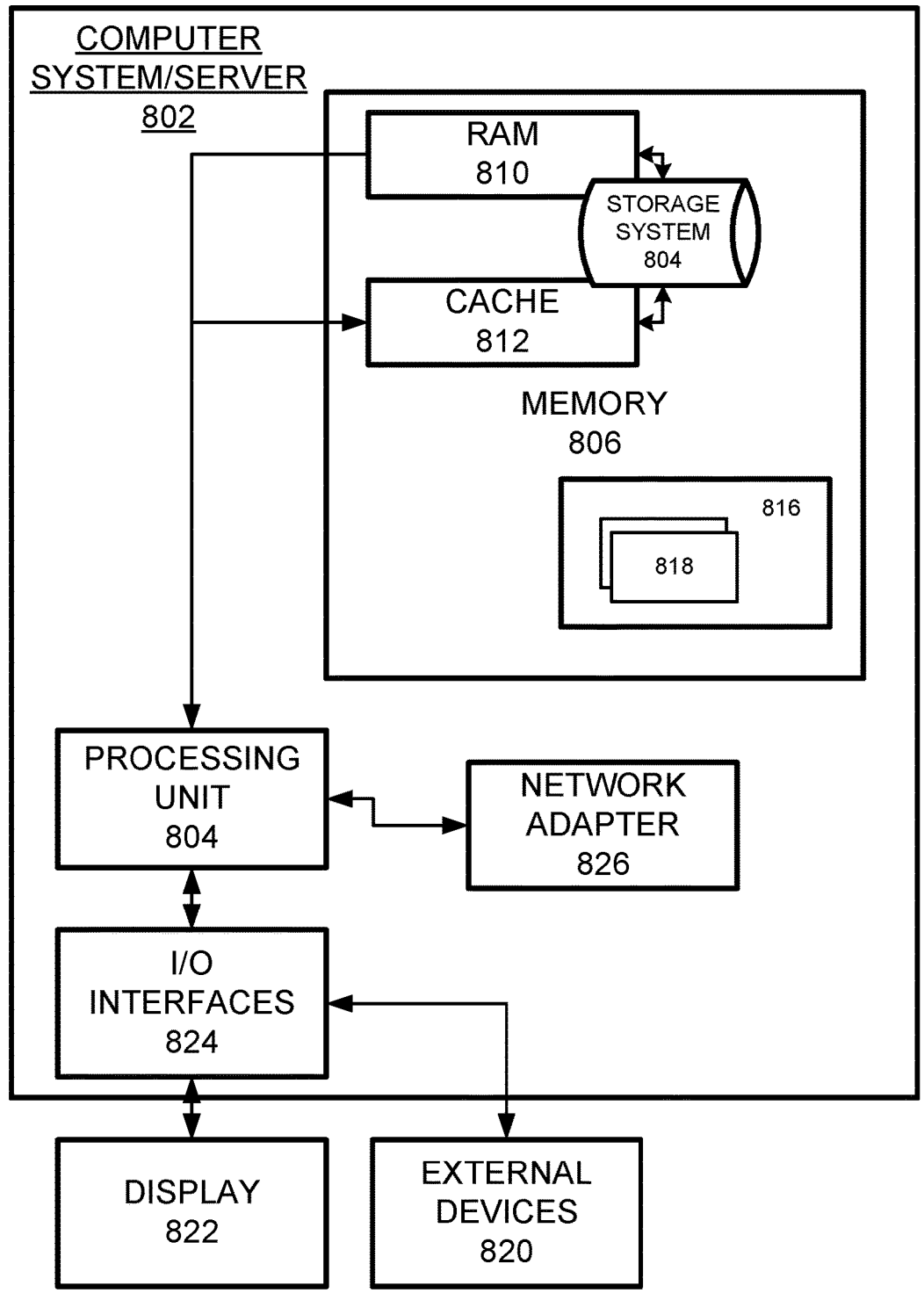
FIG. 8 illustrates an example computer system which may be used by any of the examples to store and execute instructions according to example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, Personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 8, computer system/server 802 in cloud computing node 800 is displayed in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 1214 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), flash memory, solid state disk (SSD) memory and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not displayed, other hardware and/or software components could be used in conjunction with computer system/server 802. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent, with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, Programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
    receiving, at a first drone, one or more communications from a second drone, wherein the first drone receives the one or more communications directly from the second drone;
    identifying, via the first drone, the one or more communications comprises at least one of an identifier of the second drone and a request for an identifier of the first drone;
    transmitting, via the first drone, an authentication request comprising the identifier of the second drone to a server;
    receiving, via the first drone, a confirmation from the server indicating the second drone is assigned a valid token and is authorized to participate in a current mission;
    transmitting, via the first drone, an instruction associated with the current mission to the second drone, wherein the instruction comprises a mission assignment as a portion of the current mission to be performed by the second drone over a period of time while the first drone is performing a different mission assignment portion of the current mission; and
    receiving, via the first drone, a confirmation that the second drone has accepted the mission assignment.

2. The method of claim 1, comprising
    transmitting, via the first drone, a response communication to the second drone indicating a role assigned to the first drone; and
    receiving, via the first drone, a confirmation from the second drone that the second drone is participating in the current mission with a different role than the role assigned to the first drone.

3. The method of claim 2, wherein the role is a leader and wherein the response communication further comprises a request to assign the second drone a follower role as the different role on the current mission.

4. The method of claim 1, comprising
    receiving, via the first drone, one or more heartbeat communications from the second drone at predefined time intervals; and
    transmitting a confirmation, via the first drone, to one or more of the second drone and the server confirming the heartbeat communications were received.

5. The method of claim 1, comprising
    receiving, via the first drone, one or more content communications from the second drone comprising content captured by the second drone as a requirement of the current mission; and
    forwarding, via the first drone, a content removal communication instructing the second drone to remove the content captured.

6. The method of claim 1, comprising
    moving the first drone over an area defined by the current mission and capturing content associated with the area defined by the current mission; and
    receiving, via the first drone, a content confirmation communication by the second drone indicating the second drone has moved over a different area and captured content associated with the different area defined by the current mission.

7. An apparatus comprising:
    a receiver configured to receive, at a first drone, one or more communications from a second drone, wherein the first drone receives the one or more communications directly from the second drone;
    a processor configured to identify, via the first drone, the one or more communications comprises at least one of an identifier of the second drone and a request for an identifier of the first drone;
    a transmitter configured to transmit, via the first drone, an authentication request comprising the identifier of the second drone to a server;
    wherein the receiver is also configured to receive a confirmation from the server indicating the second drone is assigned a valid token and is authorized to participate in a current mission;
    wherein the transmitter is configured to transmit an instruction associated with the current mission to the second drone, wherein the instruction comprises a mission assignment as a portion of the current mission to be performed by the second drone over a period of time while the first drone is performing a different mission assignment portion of the current mission; and
    wherein the receiver is also configured to receive a confirmation that the second drone has accepted the mission assignment.

8. The apparatus of claim 7, wherein the transmitter is further configured to transmit a response communication to the second drone indicating a role assigned to the first drone, and the receiver is configured to receive a confirmation from the second drone that the second drone is participating in the current mission with a different role than the role assigned to the first drone.

9. The apparatus of claim 8, wherein the role is a leader and wherein the response communication further comprises a request to assign the second drone a follower role as the different role on the current mission.

10. The apparatus of claim 7, wherein the receiver is configured to receive one or more heartbeat communications from the second drone at predefined time intervals, and the transmitter is configured to transmit a confirmation to one or more of the second drone and the server confirming the heartbeat communications were received.

11. The apparatus of claim 7, wherein the receiver is configured to receive one or more content communications from the second drone comprising content captured by the second drone as a requirement of the current mission, and the transmitter is configured to forward a content removal communication instructing the second drone to remove the content captured.

12. The apparatus of claim 7, wherein the processor instructs the first drone to move over an area defined by the current mission and capturing content associated with the area defined by the current mission, and the receiver is configured to receive a content confirmation communication by the second drone indicating the second drone has moved over a different area and captured content associated with the different area defined by the current mission.

13. A non-transitory computer readable storage medium configured to store instructions that when executed cause a processor to perform:
   receiving, at a first drone, one or more communications from a second drone, wherein the first drone receives the one or more communications directly from the second drone;
   identifying, via the first drone, the one or more communications comprises at least one of an identifier of the second drone and a request for an identifier of the first drone;
   transmitting, via the first drone, an authentication request comprising the identifier of the second drone to a server;
   receiving, via the first drone, a confirmation from the server indicating the second drone is assigned a valid token and is authorized to participate in a current mission; and transmitting, via the first drone, an instruction associated with the current mission to the second drone, wherein the instruction comprises a mission assignment as a portion of the current mission to be performed by the second drone over a period of time while the first drone is performing a different mission assignment portion of the current mission; and
   receiving, via the first drone, a confirmation that the second drone has accepted the mission assignment.

14. The non-transitory computer readable storage medium of claim 13, wherein the processor is further configured to perform:
   transmitting, via the first drone, a response communication to the second drone indicating a role assigned to the first drone; and
   receiving, via the first drone, a confirmation from the second drone that the second drone is participating in the current mission with a different role than the role assigned to the first drone.

15. The non-transitory computer readable storage medium of claim 14, wherein the role is a leader and wherein the response communication further comprises a request to assign the second drone a follower role as the different role on the current mission.

16. The non-transitory computer readable storage medium of claim 13, wherein the processor is further configured to perform:
   receiving, via the first drone, one or more heartbeat communications from the second drone at predefined time intervals; and
   transmitting a confirmation, via the first drone, to one or more of the second drone and the server confirming the heartbeat communications were received.

17. The non-transitory computer readable storage medium of claim 13, wherein the processor is further configured to perform:
   receiving, via the first drone, one or more content communications from the second drone comprising content captured by the second drone as a requirement of the current mission; and
   forwarding, via the first drone, a content removal communication instructing the second drone to remove the content captured.

* * * * *